United States Patent
Banin et al.

(10) Patent No.: US 12,206,496 B2
(45) Date of Patent: Jan. 21, 2025

(54) APPARATUS, SYSTEM AND METHOD OF ENCODING/DECODING DATA ACCORDING TO A PARITY FUNCTION

(71) Applicant: Intel Corporation, Santa Clara, CA (US)

(72) Inventors: Elan Banin, Raanana (IL); Lior Menashe, Rosh Haayin (IL); Eytan Mann, Modiin (IL); Ofir Degani, Nes Ammim (IL); Rotem Banin, Even-Yehuda (IL)

(73) Assignee: INTEL CORPORATION, Santa Clara, CA (US)

( * ) Notice: Subject to any disclaimer, the term of this patent is extended or adjusted under 35 U.S.C. 154(b) by 610 days.

(21) Appl. No.: 17/356,243

(22) Filed: Jun. 23, 2021

(65) Prior Publication Data

US 2022/0416941 A1 Dec. 29, 2022

(51) Int. Cl.
*H04L 1/00* (2006.01)

(52) U.S. Cl.
CPC .......... *H04L 1/0063* (2013.01); *H04L 1/0005* (2013.01); *H04L 1/0041* (2013.01); *H04L 1/0047* (2013.01)

(58) Field of Classification Search
CPC ... H04L 1/0005; H04L 1/0041; H04L 1/0047; H04L 1/0054; H04L 1/0063; H04L 27/04; H04L 27/12; H04L 27/14; H04L 27/20; H04L 27/2627; H04L 27/2649
See application file for complete search history.

(56) References Cited

U.S. PATENT DOCUMENTS

| | | | |
|---|---|---|---|
| 9,203,558 B1* | 12/2015 | Dave | H04L 23/00 |
| 2012/0131411 A1* | 5/2012 | Mumtaz | H04L 1/0054 |
| | | | 714/755 |
| 2014/0341321 A1* | 11/2014 | Tsai | H04L 27/2071 |
| | | | 375/302 |
| 2015/0049845 A1* | 2/2015 | Castelain | H04L 27/2656 |
| | | | 375/340 |
| 2020/0212943 A1 | 7/2020 | Banin et al. | |

OTHER PUBLICATIONS

Werner Ulrich, "Non-Binary Error Correction Code", The Bell System Technical Journal, Nov. 1957, pp. 1341-1388.

* cited by examiner

*Primary Examiner* — Shelly A Chase
(74) *Attorney, Agent, or Firm* — Shichrur & Co.

(57) ABSTRACT

For example, an apparatus may include an encoder configured to encode data into a plurality of codewords according to a parity function for a transmission modulated according to a Differential Modulation (DM) scheme, and/or a decoder to decode received codewords of the transmission.

25 Claims, 9 Drawing Sheets

702

Encode data for a transmission modulated according to a Differential Modulation (DM) scheme into a plurality of codewords, a codeword of the plurality of codewords including a plurality of symbols including a plurality of data symbols and a plurality of parity symbols

704

Determine the plurality of parity symbols based on a parity function applied to the plurality of symbols, the parity function configured to provide a plurality of different parity values corresponding to a respective plurality of possible errors in the plurality of symbols, the plurality of possible errors including a plurality of two-symbol DM errors and a plurality of one-symbol DM errors, wherein a two-symbol DM error of the plurality of two-symbol DM errors includes a first error corresponding to a first symbol and a second error corresponding to a second symbol adjacent to the first symbol, wherein a sign of the first error is opposite to a sign of the second error

706

Output the plurality of codewords

Fig. 7

APPARATUS, SYSTEM AND METHOD OF ENCODING/DECODING DATA ACCORDING TO A PARITY FUNCTION

TECHNICAL FIELD

Embodiments described herein generally relate to encoding and/or decoding data according to a parity function.

BACKGROUND

A transmission between two devices, e.g., a processor and a network card, may be modulated according to a Pulse Width Modulation (PWM) scheme.

The transmission may be subject to interferences, which may cause one or more errors at a receiver of the transmission.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 7 is a schematic flow-chart illustration of a method of encoding data for a transmission modulated according to a Differential Modulation (DM) scheme, in accordance with some demonstrative embodiments.

DETAILED DESCRIPTION

Figure 1:
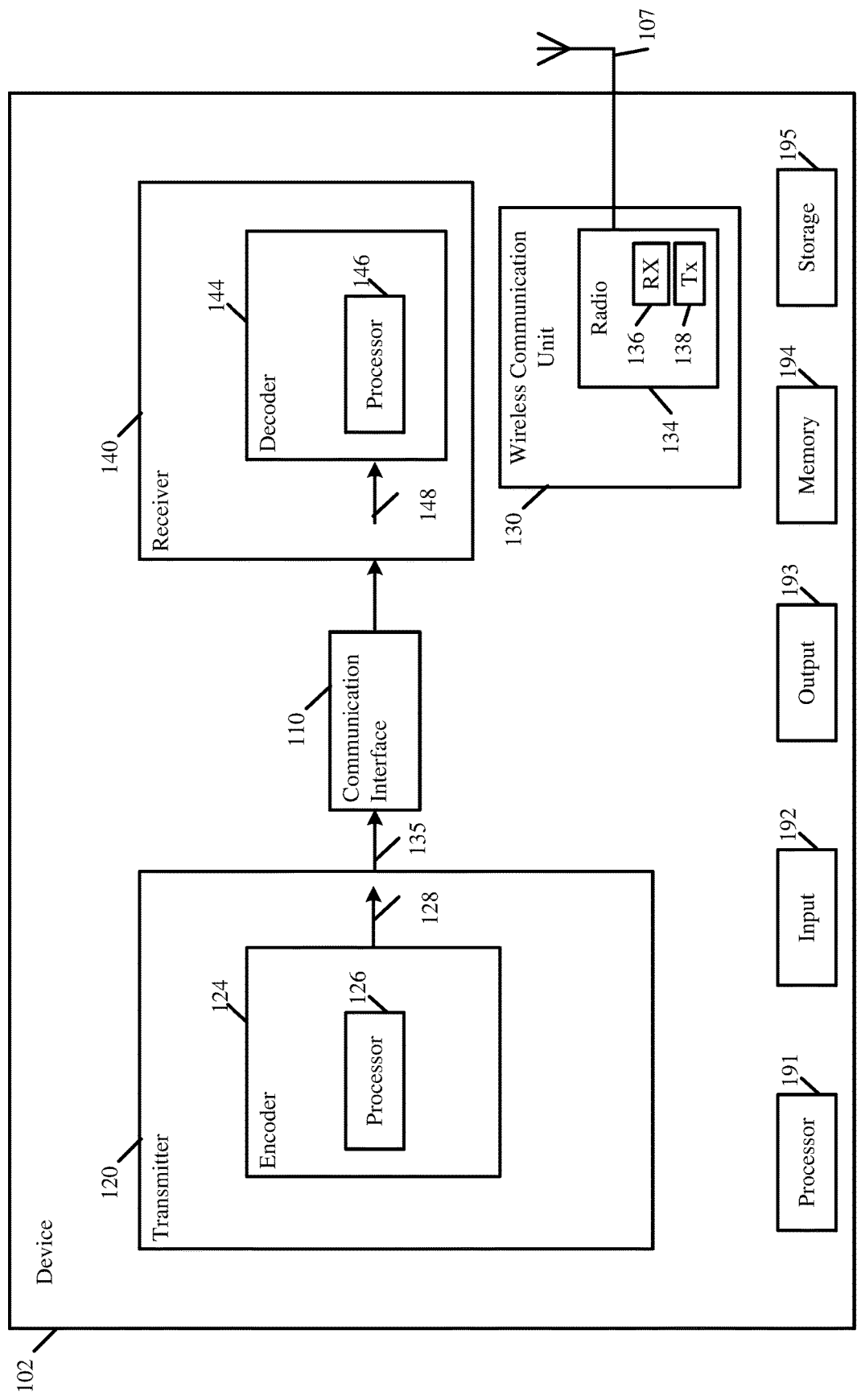
FIG. 1 is a schematic block diagram illustration of a device, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016)), and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of a wired communication signal or in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network, for example, for communicating over a frequency band of 2.4 GHz, 5 GHz, 6-7 GHz, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like. Other embodiments, may be used in conjunction with any other system or devices, e.g., wired and/or wireless.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments may be implemented for "peer to peer (P2P) communication", which may relate to device-to-device communication over a link ("peer-to-peer link", "P2P channel", or "P2P link") between devices. For example, the P2P may be between two silicon devices. For example, the P2P link may include a Peripheral Component Interconnect Express (PCIe) link, a Mobile Industry Processor Interface (MIPI) link, a MIPI M-Physical (M-PHY) link, or the like. Other embodiments may be implemented for any other additional or alternative communication scheme and/or technology.

Reference is now made to FIG. 1, which schematically illustrates a block diagram of a device 102, in accordance with some exemplary embodiments.

In some demonstrative embodiments, device 102 may include a wireless communication device. For example, device 102 may be configured to perform wireless communication with one or more other wireless communication devices.

In some demonstrative embodiments, device 102 may be capable of communicating content, data, information and/or signals via a wireless medium (WM). In some demonstrative embodiments, wireless medium may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, the wireless network may include, for example, a radio channel, a cellular channel, an RF channel, a WiFi channel, an IR channel, and the like. Device 102 may optionally be capable of communicating over any additional or alternative suitable wired and/or wireless communication links.

In some demonstrative embodiments, device 102 may include one or more wireless communication units to interface with the wireless network. For example, device 102 may include a wireless communication unit 130 to interface between wireless communication device 102 and the wireless network.

In some demonstrative embodiments, wireless communication unit 130 may include one or more radios to perform wireless communication between device 102 and/or one or more other wireless communication devices. For example, wireless communication unit 130 may include at least one radio 134.

In some demonstrative embodiments, radio 134 may include one or more wireless receivers (Rx) including circuitry and/or logic to receive wireless communication signals, RF signals, frames, blocks, transmission streams, packets, messages, data items, and/or data. For example, radio 134 may include at least one receiver 136.

In some demonstrative embodiments, radio 134 may include one or more wireless transmitters (Tx) including circuitry and/or logic to transmit wireless communication signals, RF signals, frames, blocks, transmission streams, packets, messages, data items, and/or data. For example, radio 134 may include at least one transmitter 138.

In some demonstrative embodiments, radio 134, transmitter 138, and/or receiver 136 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a computing device.

In some demonstrative embodiments, device 102 may include a storage device.

In other embodiments, device 102 may include any other device, which may or may not implement wireless connectivity, e.g., via wireless communication unit 130.

In some demonstrative embodiments, device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a Solid State Drive (SSD), a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, device 102 may include a transmitter 120 a receiver 140 to communicate transmissions between elements and/or components of device 102, for example, via a communication interface 110, e.g., as described below.

In some demonstrative embodiments, transmitter 120 may be configured to transmit the transmissions to receiver 140; and/or receiver 140 may be configured to receive and/or process the transmissions from transmitter 120, for example, via communication interface 110, e.g., as described below.

In some demonstrative embodiments, transmitter 120 may be implemented, for example, as part of a System on Chip (SoC); and/or receiver 140 may be implemented, for example, as part of wireless communication unit 130, e.g., as part of a wireless network interface device, e.g., a Wireless Network Interface Card (WNIC).

In one example, the SoC may be configured to provide data to be transmitted by radio 134 over the wireless medium. According to this example, the data may be provided by the SoC via the transmitter 120 and communication interface 110 to receiver 140, which may provide the data to the wireless communication unit 130.

In some demonstrative embodiments, transmitter 120 may be implemented, for example, as part of a processing unit and/or a data source, e.g., processor 191; and/or receiver 140 may be implemented, for example, as part of a storage and/or memory device, e.g., storage 195 and/or memory 194.

In one example, the processing unit and/or the data source may be configured to provide data to be stored in the storage device. According to this example, the data may be provided by the processing unit and/or the data source via the transmitter 120 and communication interface 110 to receiver 140, which may provide the data to the storage device.

In some demonstrative embodiments, device 102 may be configured to implement a plurality of transmitter-receiver pairs, for example, to support bi-directional communication between the elements of device 102.

For example, device 102 may include a first transmitter 120 and a first receiver 140 to communicate data in a first direction from a first element of device 102, e.g., processor 191, to a second element of device 102, e.g., wireless communication unit 130; and a second transmitter 120 and a second receiver 140 to communicate data in a second direction from the second element of device 102, e.g., wireless communication unit 130, to the first element of device 102, e.g., processor 191.

In one example, device 102 may include a first transmitter/receiver (TX/RX), e.g., implemented in conjunction with processor 191, and a second TX/Rx implemented in conjunction with wireless communication unit 130, for example, to support bi-directional communication between processor 191 and wireless communication unit 130, e.g., as described below.

In some demonstrative embodiments, transmitter 120 and/or receiver 140 may be configured to communicate according to a serial modulation scheme, e.g., as described below. In other embodiments, any other communication scheme may be implemented.

In some demonstrative embodiments, the serial modulation scheme may be configured according to a Serial Time Encoded Protocol (STEP), e.g., as described below. In other embodiments, any other modulation scheme and/or protocol may be implemented.

In some demonstrative embodiments, the STEP may include a digital interface protocol. For example, the STEP may include a protocol of a fast serial interface modulation scheme, which may support various applications. For example, the STEP may be configured to interconnect two silicon devices, e.g., transmitter 120 and receiver 140 in a P2P manner.

In one example, the STEP may implement one or more functionalities similar to one or more other digital interface protocols, e.g., a Peripheral Component Interconnect Express (PCIe) link, a Mobile Industry Processor Interface (MIPI) link, a MIPI M-Physical (M-PHY) link, and/or the like.

In some demonstrative embodiments, there may be a need to address a technical issue of mitigating errors, which may occur in transmissions performed between transmitter 120 and receiver 140 via communication interface 110, e.g., as described below.

In one example, in some cases these errors may even result in a total system crash, e.g., in the form of errors in an interface to memory.

In some demonstrative embodiments, the serial modulation scheme, e.g., the STEP, may be exposed to errors during transmissions, e.g., as any other digital interface. For example, the errors may result from aggression and/or interferences from other sources. For example, the errors may result from Radio Frequency Interference (RFI) radiation, e.g., from cellular phones, from cross talk of adjacent signals, e.g., other signals routed close to the STEP interface, from random or deterministic noise, and/or from any other source.

In some demonstrative embodiments, one or more schemes may be applied to improve, e.g., in order of one or more magnitudes, a Bit Error Rate (BER) of a transmission, e.g., compared to a native PHY level BER.

In one example, a PCIe Protocol may employ an acknowledgement (ACK) and retransmission scheme. For example, a coherency check code, which may allow a receiver to validate integrity of the packet, may be added, for example, for each packet unit transmitted according to the PCIe protocol.

In another example, one or more applications may employ an Error Correction Code (ECC) scheme. For example, the ECC scheme may add parity bits, which may allow a receiving side to correct bit errors, which may improve the BER, e.g., to 1e-18 or better.

In some demonstrative embodiments, transmitter 120 and/or receiver 140 may be configured to communicate transmissions modulated according to a Differential Modulation (DM) scheme, e.g., as described below.

In some demonstrative embodiments, the DM scheme may include a Pulse Width Modulation (PWM) scheme, e.g., as described below.

In some demonstrative embodiments, the DM scheme may include a differential Pulse amplitude Modulation (PAM) scheme, e.g., as described below.

In some demonstrative embodiments, the DM scheme may include a differential Phase Shift Keying (PSK) (Differential-PSK) scheme.

In other embodiments, the DM scheme may include any other additional or alternative differential scheme.

In some demonstrative embodiments, a transmission modulated according to the DM scheme may suffer from one or more possible errors, e.g., as described below. The one or more possible errors may include one or more predefined, predetermined, potential, hypothetical, and/or theoretical errors, which may possibly, theoretically, and/or potentially occur in the transmission.

In some demonstrative embodiments, the possible errors according to the DM scheme may correspond to symbols in the transmissions, for example, compared to bit errors in other communication protocols.

In some demonstrative embodiments, an error in a transmission modulated according to the DM scheme may cause a value of a symbol in the transmission to increase or decrease. This is different from bit errors in other communication protocols, in which a bit error in a bit may turn a bit from 0 to 1, or vice versa.

In some demonstrative embodiments, the possible errors according to the DM scheme may have specific patterns. For example, adjacent errors may be correlated, while other errors may be much less probable, e.g., as described below.

In one example, a first symbol may change to its +1 or −1 neighbor-code, while a second symbol, e.g., adjacent to the first symbol, may or may not suffer from an opposite error, e.g., as described below.

In some demonstrative embodiments, the possible errors according to the DM scheme may include two-symbol DM errors and one-symbol DM errors, e.g., as described below.

In some demonstrative embodiments, a one-symbol DM error may include an error of (−1) or (+1), for example, in a single symbol, e.g., as described below.

In some demonstrative embodiments, a two-symbol DM error may include an error in two adjacent symbols, e.g., as described below.

In some demonstrative embodiments, the two-symbol DM error may include a first error corresponding to a first symbol, and a second error corresponding to a second symbol adjacent to the first symbol, e.g., as described below.

In some demonstrative embodiments, the first error and the second error may be correlated. For example, a sign of the first error may be opposite to a sign of the second error, e.g., as described below.

In some demonstrative embodiments, the first error and the second error may be (−1, +1) or (+1, −1), e.g., as described below.

In some demonstrative embodiments, the possible errors according to the DM scheme may include two-symbol PWM errors and one-symbol PWM errors, e.g., as described below.

In some demonstrative embodiments, the one-symbol PWM error may include an error corresponding to a single pulse of the PWM transmission, e.g., as described below.

In some demonstrative embodiments, the two-symbol PWM error may include a first error corresponding to a first symbol of a PWM transmission, and a second error corresponding to a second symbol adjacent to the first symbol of the PWM transmission, e.g., as described below.

In some demonstrative embodiments, the first symbol may correspond to a first pulse in the PWM transmission, and the second symbol may correspond to a second pulse in the PWM transmission, e.g., as described below.

In some demonstrative embodiments, the second pulse may be adjacent to the first pulse, e.g., as described below.

In some demonstrative embodiments, the two-symbol PWM error may correspond to an edge-shift of an edge, which is shared between the first pulse and the second pulse, e.g., as described below.

In some demonstrative embodiments, the two-symbol PWM errors and the one-symbol PWM errors may be the result of the fact that information in the PWM transmission may be coded edge-to-edge, and, therefore, when an edge offset occurs, it may affect two adjacent symbols or only one symbol, e.g., as described below.

Figure 2:
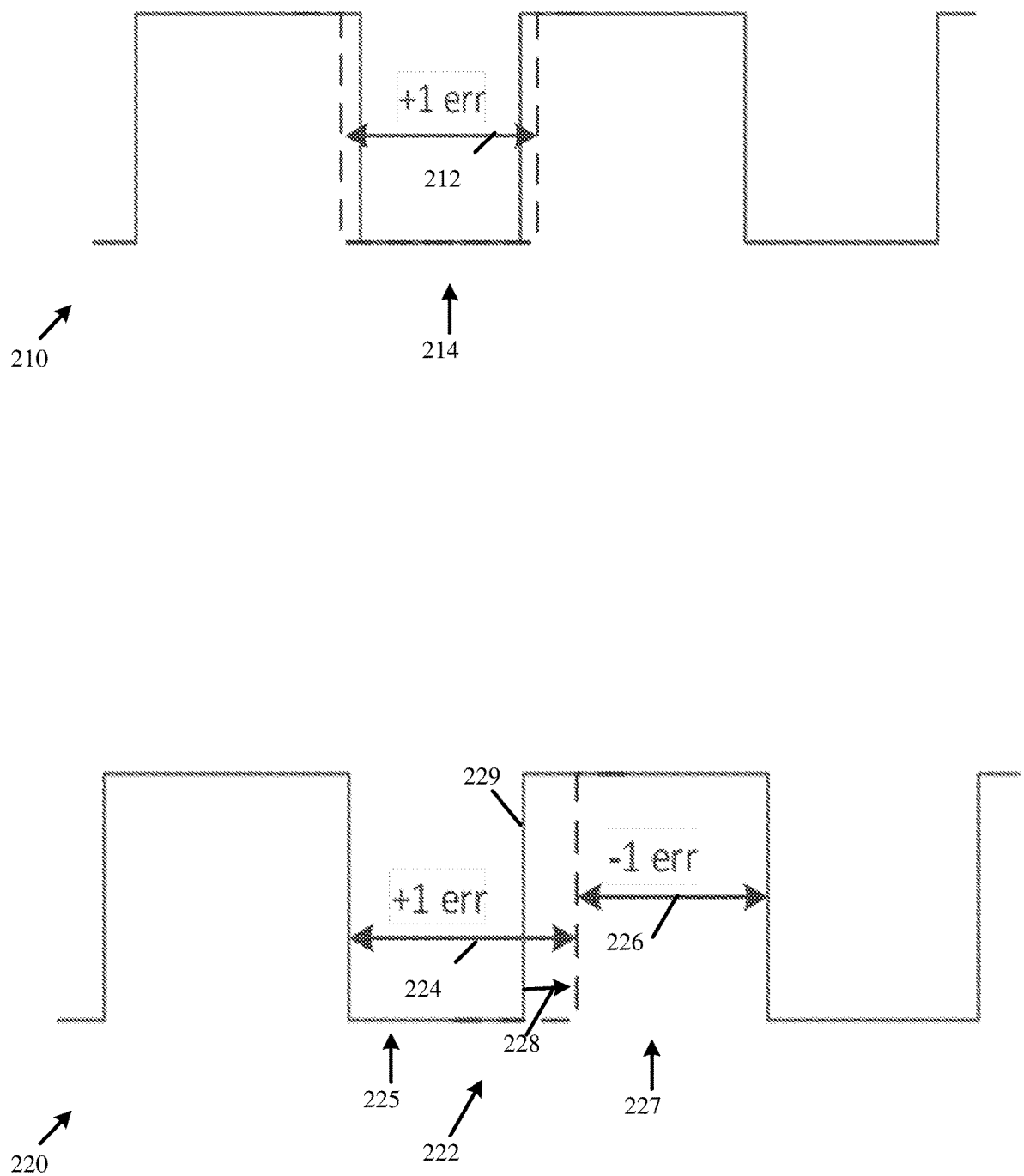
FIG. 2 is a schematic illustration of a first transmission signal and a second transmission signal to demonstrate a technical problem, which may be addressed in accordance with some demonstrative embodiments.

Reference is made to FIG. 2, which schematically illustrates a first transmission signal 210 and a second transmission signal 220 to demonstrate a technical problem, which may be addressed in accordance with some demonstrative embodiments.

In one example, the transmission signal 210 and transmission signal 220 may be modulated according to a PWM scheme.

In some demonstrative embodiments, first transmission signal 210 demonstrates a one-symbol DM error 212 including an error of (+1), for example, in a single symbol corresponding to a single pulse 214 of first transmission signal 210, e.g., as described below.

In some demonstrative embodiments, second transmission signal 220 demonstrates a two-symbol DM error 222 including an error of (+1, −1).

In some demonstrative embodiments, as shown in FIG. 2, two-symbol DM error 222 may include a first error 224, e.g., of (+1), in a first symbol corresponding to a first pulse 225, and a second error 226, e.g., of (−1), in a second symbol corresponding to a second pulse 227 adjacent to the first pulse 225.

In some demonstrative embodiments, as shown in FIG. 2, a sign of the first error 224 may be opposite to a sign of the second error 226.

In some demonstrative embodiments, as shown in FIG. 2, the two-symbol DM error 222 may correspond to an edge-shift 228 of an edge 229, which is shared between the first pulse 225 and the second pulse 227.

In some demonstrative embodiments, information may be coded on a pulse width of a pulse, e.g., pulses 214, 225, and/or 227, for example, on a distance between two adjacent edges.

In some demonstrative embodiments, jitter noise, or any other noise, may shift a timing of an edge and may change the pulse width, and, accordingly, the information coded on the pulse width.

In some demonstrative embodiments, as shown in FIG. 2, a relatively small jitter noise may cause one-symbol DM error 212 on the receiving side.

In some demonstrative embodiments, as shown in FIG. 2, a rare instance of a relatively large edge-shift 228 of edge 229 may cause an error on two adjacent symbols, since each edge is the start of one symbol and the end of another symbol, for example, the symbol on its right and the symbol on its left, e.g., corresponding to pulses 225 and 227, with an opposite direction.

In other embodiments, the errors shown in FIG. 2 may occur in other types of DM schemes, for example, differential-PSK.

Referring back to FIG. 1, in some demonstrative embodiments, there may be a need to provide a technical solution to provide efficient and/or accurate identification and/or correction of the possible errors in transmissions modulated according to the DM scheme, e.g., as described below.

In some demonstrative embodiments, there may be one or more disadvantages, inefficiencies, and/or technical problems, for example, in an implementation relying on common Error Correction Code (ECC) schemes, e.g., Hamming, Reed-Solomon, Low-density parity-check (LDPC) and/or the like, to identify and correct the plurality of possible errors, e.g., as described below.

In one example, the common ECC schemes may require large blocks of data to be "efficient", e.g., to have a small overhead. Therefore, the common ECC schemes may introduce relatively long delays, and/or may normally address a single-symbol error. The common ECC schemes may have a bad utilization of two-symbol errors, for example, as these ECC schemes may require to address all combinatoric permutations, which may cover more than the probable cases. In addition, the common ECC schemes may not be implemented in a PHY-layer, and may only be added in an outer-layer, for example, due to their complexity.

In some demonstrative embodiments, there may be one or more disadvantages, inefficiencies, and/or technical problems, for example, in an implementation relying on a long symbol time to reduce probability of errors, e.g., improving SNR, to identify and correct the possible errors. For example, this implementation may mitigate a need for ECC, but may have a cost of a lower data-throughput.

In some demonstrative embodiments, there may be one or more disadvantages, inefficiencies, and/or technical problems, for example, in an implementation relying on Gray coding and ECC for correcting two-symbol errors, e.g., using a Reed-Solomon mechanism, to identify and correct the possible errors. For example, this implementation may have a high complexity and may require complex decoding algorithms, which may not be efficient for HW. In addition, this implementation may have a low coding-rate.

In some demonstrative embodiments, there may be a need to address a technical issue in an implementation relying on modulo operations to identify and correct the plurality of possible errors. For example, this implementation may be simple to implement for one-symbol DM errors, but may not be suitable for correcting two-symbol DM errors.

In some demonstrative embodiments, transmitter 120 and receiver 140 may be configured to communicate a transmission according to an ECC scheme, which may enable to identify and/or correct possible errors, e.g., one-symbol DM errors and two-symbol DM errors, in transmissions modulated according to a DM scheme, e.g., as described below.

In some demonstrative embodiments, the ECC scheme may be suitable for STEP schemes and/or other protocols, e.g., D-PSK, PWM, and/or differential PAM, as described below.

In some demonstrative embodiments, the ECC scheme may be suitable for implementation on silicon devices, e.g., as described below.

In some demonstrative embodiments, the ECC scheme may be configured to provide a solution which may not induce high latency over the transmissions, In some demonstrative embodiments, the ECC scheme may be simple enough to be implemented, e.g., directly, on a PHY-level, e.g., as described below.

In some demonstrative embodiments, the ECC scheme may be configured to provide a solution which may not consume high power, e.g., as describe below.

In some demonstrative embodiments, the ECC scheme may correct error-types which may be common to the interface, for example, the one-symbol DM errors and two-symbol DM errors, e.g., as describe below.

In some demonstrative embodiments, the ECC scheme may have a reduced complexity, and/or may be easy and/or simple to implement in HW, e.g., as describe below.

In some demonstrative embodiments, the ECC scheme may have a reduced latency, e.g., as describe below.

In some demonstrative embodiments, the ECC scheme may have a reduced parity overhead. For example, the ECC scheme may support a relatively high code rate, e.g., as describe below.

In some demonstrative embodiments, the ECC scheme may improve a reliability of communication, for example, between transmitter 120 and receiver 140 e.g., as describe below.

In some demonstrative embodiments, the ECC scheme may be based on modulo codes with an added capability of detecting and fixing not only a one-symbol DM error, but also a two-symbol DM error, e.g., as describe below.

In some demonstrative embodiments, transmitter 120 may include an encoder 124 configured to encode data for a transmission 135 modulated according to a DM scheme, e.g., as described below.

In some demonstrative embodiments, transmitter 120 may be configured to transmit the transmission 135 modulated according to the DM scheme, e.g., as described below.

In some demonstrative embodiments, encoder 124 may include a processor 126 configured to encode the data into a plurality of codewords, e.g., as described below.

In some demonstrative embodiments, processor 126 may be configured to perform and/or to trigger, cause, instruct and/or control transmitter 120 to perform, one or more communications, to generate and/or communicate one or more messages and/or transmissions, and/or to perform one or more functionalities, operations and/or procedures between transmitter 120 and receiver 140, and/or one or more other elements of device 102, e.g., as described below.

In some demonstrative embodiments, processor 126 may include, or may be implemented, partially or entirely, by circuitry and/or logic, e.g., one or more processors including circuitry and/or logic, memory circuitry and/or logic, digital Physical Layer (PHY) circuitry and/or logic. Additionally or alternatively, one or more functionalities of processor 126 may be implemented by logic, which may be executed by a machine and/or one or more processors, e.g., as described below.

In some demonstrative embodiments, processor 126 may be configured to encode the data into the plurality of codewords, e.g., as described below.

In some demonstrative embodiments, encoder 124 may include an output 128 to output the plurality of codewords, e.g., as described below.

In some demonstrative embodiments, a codeword of the plurality of code words may include a plurality of symbols, e.g., as described below.

In some demonstrative embodiments, the plurality of symbols may include a plurality of data symbols and a plurality of parity symbols, e.g., as described below.

In some demonstrative embodiments, processor 126 may be configured to determine the plurality of parity symbols, for example, based on a parity function applied to the plurality of symbols, e.g., as described below.

In some demonstrative embodiments, the parity function may be configured to provide a plurality of different parity values corresponding to a respective plurality of possible errors (also referred to as "predefined errors", "predetermined errors", "potential errors", "hypothetical errors", or "theoretical errors") in the plurality of symbols, e.g., as described below. The plurality of possible errors may include predefined, predetermined, potential, hypothetical, and/or theoretical errors, which may possibly, theoretically, and/or potentially occur in the transmission.

In some demonstrative embodiments, the plurality of predefined errors may include a plurality of two-symbol DM errors and a plurality of one-symbol DM errors, e.g., as described below.

In some demonstrative embodiments, the plurality of two-symbol DM errors may include all possible two-symbol DM errors in the codeword, e.g., as described below. In other embodiments, the plurality of two-symbol DM errors may include some of the possible two-symbol DM errors in the codeword.

In some demonstrative embodiments, the plurality of one-symbol DM errors may include all possible one-symbol DM errors in the codeword, e.g., as described below. In other embodiments, the plurality of two-symbol DM errors may include some of the possible one-symbol DM errors in the codeword.

In some demonstrative embodiments, a one-symbol DM error of the plurality of one-symbol DM errors may include an error of (−1) or (+1), e.g., as described below.

In other embodiments, a one-symbol DM error of the plurality of one-symbol DM errors may include any other symbol error.

In some demonstrative embodiments, a two-symbol DM error of the plurality of two-symbol DM errors may include a first error corresponding to a first symbol, and a second error corresponding to a second symbol adjacent to the first symbol, e.g., as described below.

In some demonstrative embodiments, a sign of the first error may be opposite to a sign of the second error, e.g., as described below.

In some demonstrative embodiments, the first error and the second error may be (−1, +1) or (+1, −1), e.g., as described below.

In other embodiments, the first error and/or the second error may include any other symbol errors.

In some demonstrative embodiments, processor 126 may be configured to determine the plurality of parity symbols, for example, such that a result of the parity function is a predefined no-error parity value, e.g., as described below.

In one example, the predefined no-error parity value may include the value of zero.

In another example, the predefined no-error parity value may include any other value.

In some demonstrative embodiments, the plurality of different parity values may include a first plurality of parity values to identify the plurality of one-symbol DM errors, respectively, and a second plurality of parity values to identify the plurality of two-symbol DM errors, respectively, e.g., as described below.

In some demonstrative embodiments, an absolute value of each of the first plurality of parity values may be equal to or greater than a predefined value, e.g., as described below.

In some demonstrative embodiments, an absolute value of each of the second plurality of parity values may be less than the predefined value, e.g., as described below.

In other aspects, the first and/or second pluralities of parity values may be defined according to any other configuration using any other values.

In some demonstrative embodiments, a particular parity value of the plurality of different parity values corresponding to a particular two-symbol DM error of the plurality of two-symbol DM errors may be configured to identify a position of the particular two-symbol DM error, a sign of a first error of the particular two-symbol DM error, and a sign of a second error of the particular two-symbol DM error, e.g., as described below.

In some demonstrative embodiments, a particular parity value of the plurality of different parity values corresponding to a particular one-symbol DM error of the plurality of one-symbol DM errors may be configured to identify a position of the particular one-symbol DM error, and a sign of the particular one-symbol DM error, e.g., as described below.

In some demonstrative embodiments, four different parity values corresponding to the same position in the codeword may be used to identify four different types of errors corresponding to the position, e.g., as described below. In other embodiments, any other number of parity values may be defined with respect to a position in the codeword.

In some demonstrative embodiments, a first parity value of the plurality of different parity values may identify a first two-symbol DM error at the particular position in the codeword, and/or a second parity value of the plurality of different parity values may identify a second two-symbol DM error at the particular position, e.g., as described below.

In some demonstrative embodiments, a sign of a first error of the first two-symbol DM error may be opposite to a sign of a first error of the second two-symbol DM error, e.g., as described below.

In some demonstrative embodiments, a sign of a second error of the first two-symbol DM error may be opposite to a sign of a second error of the second two-symbol DM error, e.g., as described below.

In some demonstrative embodiments, a third parity value of the plurality of different parity values may identify a first one-symbol DM error at the particular position, and/or a fourth parity value of the plurality of different parity values may identify a second one-symbol DM error at the particular position, e.g., as described below.

In some demonstrative embodiments, a sign of the first one-symbol DM error may be opposite to a sign of the second one-symbol DM error, e.g., as described below.

In some demonstrative embodiments, the parity function may include a modulo operation applied to a sum of a plurality of products of a plurality of coefficients respectively multiplied by the plurality of symbols, e.g., as described below.

In some demonstrative embodiments, a divisor of the modulo operation may be based, for example, on four times a count of symbols in the plurality of symbols, e.g., as described below.

In other embodiments, the divisor of the modulo operation may be defined based on any other value.

In some demonstrative embodiments, processor 126 may be configured to determine a first result by applying a first modulo function to the plurality of data symbols, e.g., as described below.

In some demonstrative embodiments, processor 126 may be configured to determine the plurality of parity symbols such that a second result of a second modulo function applied to the plurality of parity symbols may be an additive inverse of the first result, e.g., as described below.

In some demonstrative embodiments, the plurality of coefficients may include a plurality of data coefficients and a plurality of parity coefficients, e.g., as described below.

In some demonstrative embodiments, the plurality of data coefficients may be respectively multiplied by the plurality of data symbols, and/or the plurality of parity coefficients may be respectively multiplied by the plurality of parity symbols, e.g., as described below.

In some demonstrative embodiments, a value of a parity coefficient of the plurality of parity coefficients may be based, for example, on a count of possible values per data symbol, e.g., as described below.

In some demonstrative embodiments, the plurality of coefficients may include a first plurality of coefficients and a second plurality of coefficients, e.g., as described below.

In some demonstrative embodiments, the first plurality of coefficients may be respectively multiplied by a first plurality of symbols in odd positions, e.g., as described below.

In some demonstrative embodiments, the second plurality of coefficients may be respectively multiplied by a second plurality of symbols in even positions, e.g., as described below.

In some demonstrative embodiments, the first plurality of coefficients may be based, for example, on a first function, and/or the second plurality of coefficients may be based, for example, on a second function, which may be different from the first function, e.g., as described below.

In some demonstrative embodiments, one plurality of coefficients of the first and second pluralities of coefficients may include a decreasing arithmetic sequence, and/or another plurality of coefficients of the first and second pluralities of coefficients may include an increasing arithmetic sequence, e.g., as described below.

In some demonstrative embodiments, a count of symbols in the plurality of data symbols may be based, for example, on a code rate of the codeword and/or a count of possible values per data symbol, e.g., as described below.

In other embodiments, the count of symbols in the plurality of data symbols may be defined based, for example, on any other attributes and/or parameters.

In some demonstrative embodiments, the DM scheme may include a PWM scheme, e.g., as described below.

In some demonstrative embodiments, the first symbol may correspond to a first pulse in the transmission 135, and the second symbol may correspond to a second pulse in the transmission 135, e.g., as described below.

In some demonstrative embodiments, the second pulse may be adjacent to the first pulse, and the two-symbol DM error may correspond to an edge-shift of an edge, which may be shared between the first pulse and the second pulse, e.g., as described below.

In some demonstrative embodiments, the DM scheme may include a differential PAM scheme.

In other embodiments, the DM scheme may include any other scheme.

In some demonstrative embodiments, receiver 140 may be configured to receive the transmission 135 modulated according to the DM scheme, e.g., as described below.

In some demonstrative embodiments, receiver 140 may be configured to process a received transmission based on the transmission 135 modulated according to the DM scheme, e.g., as described below.

In some demonstrative embodiments, receiver 140 may include a decoder 144 configured to decode the received transmission modulated according to the DM scheme, e.g., as described below.

In some demonstrative embodiments, decoder 144 may include an input 148 to receive a codeword of the received transmission, for example, based on the transmission 135, e.g., as described below.

In some demonstrative embodiments, the codeword may include a plurality of symbols including a plurality of data symbols and a plurality of parity symbols.

In one example, the plurality of symbols including the plurality of data symbols and the plurality of parity symbols may correspond to a codeword in the plurality of codewords transmitted in transmission 135, e.g., by transmitter 120.

In some demonstrative embodiments, decoder 144 may include a processor 146 configured to decode the codeword of the received transmission, e.g., as described below.

In some demonstrative embodiments, processor 146 may be configured to perform and/or to trigger, cause, instruct and/or control receiver 140 to perform, one or more communications, to generate and/or communicate one or more messages and/or transmissions, and/or to perform one or more functionalities, operations and/or procedures between receiver 140 and transmitter 120, and/or one or more other elements of device 102, e.g., as described below.

In some demonstrative embodiments, processor 146 may include, or may be implemented, partially or entirely, by circuitry and/or logic, e.g., one or more processors including circuitry and/or logic, memory circuitry and/or logic, digital Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of processor 126. Additionally or alternatively, one or more functionalities of processor 126 may be implemented by logic, which may be executed by a machine and/or one or more processors, e.g., as described below.

In some demonstrative embodiments, processor 146 may be configured to determine a decoder parity value of the parity function applied to a plurality of symbols of the received codeword, e.g., as described below.

In some demonstrative embodiments, processor 146 may be configured to, based on the decoder parity value, identify a two-symbol DM error in the received codeword, e.g., as described below.

In some demonstrative embodiments, the two-symbol DM error in the received codeword may include a first error corresponding to a first symbol and a second error corresponding to a second symbol adjacent to the first symbol, for example, a sign of the first error may be opposite to a sign of the second error, e.g., as described below.

In some demonstrative embodiments, processor 146 may be configured to determine a position of the two-symbol DM error in the received codeword, the sign of the first error, and/or the sign of the second error, for example, based on the decoder parity value, e.g., as described below.

In one example, the first error and the second error in the received codeword may be $(-1, +1)$ or $(+1, -1)$.

In some demonstrative embodiments, processor 146 may be configured to determine two corrected symbols based on the detected two-symbol DM error in the received codeword, e.g., as described below.

In some demonstrative embodiments, processor 146 may be configured to output a decoded codeword including plurality of decoded data symbols corresponding to the codeword. For example, the plurality of decoded data symbols may be based on the two corrected symbols, e.g., as described below.

In some demonstrative embodiments, processor 146 may be configured to identify a one-symbol DM error in the received codeword, for example, based on the decoder parity value, e.g., as described below.

In some demonstrative embodiments, the one-symbol DM error in the received codeword may include an error corresponding to a symbol in the received codeword, e.g., as described below.

In one example, the one-symbol DM error in the received codeword may be (+1) or (−1).

In some demonstrative embodiments, processor 146 may be configured to determine a position of the one-symbol DM error in the received codeword, and a sign of the error, for example, based on the decoder parity value, e.g., as described below.

In some demonstrative embodiments, processor 146 may be configured to determine a corrected symbol based on the detected one-symbol DM error, e.g., as described below.

In some demonstrative embodiments, processor 146 may be configured to output a decoded codeword including plurality of decoded data symbols corresponding to the codeword. For example, the plurality of decoded data symbols may be based on the corrected symbol, e.g., as described below.

In some demonstrative embodiments, processor 146 may be configured to determine the received codeword is errorless, for example, when the decoder parity value is the predefined no-error parity value, e.g., as described below.

In some demonstrative embodiments, processor 146 may be configured to output a decoded codeword including the plurality of decoded data symbols corresponding to the codeword, for example, when the received codeword is errorless, e.g., as described below.

In some demonstrative embodiments, the parity function may be configured to provide a plurality of different decoder parity values to identify a respective plurality of possible errors in the received codeword, the plurality of possible errors may include the plurality of two-symbol DM errors and the plurality of one-symbol DM errors, e.g., as described below.

In some demonstrative embodiments, a particular decoder value of the plurality of different decoder parity values corresponding to a particular two-symbol DM error of the plurality of two-symbol DM errors is configured to identify a position of the particular two-symbol DM error in the received codeword, a sign of a first error of the particular two-symbol DM error in the received codeword, and a sign of a second error of the particular two-symbol DM error in the received codeword, e.g., as described below.

In some demonstrative embodiments, a particular decoder parity value of the plurality of different decider parity values corresponding to a particular one-symbol DM error of the plurality of one-symbol DM errors may be configured to identify a position of the particular one-symbol DM error in the received codeword, and a sign of the particular one-symbol DM error in the received codeword, e.g., as described below.

In some demonstrative embodiments, the plurality of different decoder parity values may include the first plurality of parity values to identify the plurality of one-symbol DM errors, respectively, and the second plurality of parity values to identify the plurality of two-symbol DM errors, respectively, e.g., as described below.

In some demonstrative embodiments, a first decoder parity value of the plurality of different decoder parity values may identify a first two-symbol DM error at a particular position in the received codeword, and a second decoder parity value of the plurality of different decider parity values may identify a second two-symbol DM error at the particular position, e.g., as described below.

In some demonstrative embodiments, a sign of a first error of the first two-symbol DM error in the received codeword may be opposite to a sign of a first error of the second two-symbol DM error in the received codeword, and a sign of a second error of the first two-symbol DM error in the received codeword may be opposite to a sign of a second error of the second two-symbol DM error in the received codeword, e.g., as described below.

In some demonstrative embodiments, a third decoder parity value of the plurality of different decider parity values may identify a first one-symbol DM error at the particular position in the received codeword, and a fourth decoder parity value of the plurality of different decider parity values may identify a second one-symbol DM error at the particular position in the received codeword, a sign of the first one-symbol DM error may be opposite to a sign of the second one-symbol DM error in the received codeword, e.g., as described below.

In some demonstrative embodiments, processor 146 may be configured to apply the parity function including the modulo operation applied to a sum of a plurality of products of the plurality of coefficients, e.g., including the plurality of data coefficients and the plurality of parity coefficients, respectively, multiplied by the plurality of symbols of the received codeword, e.g., as described below.

In some demonstrative embodiments, processor 146 may be configured to respectively multiply the plurality of data coefficients by the plurality of data symbols in the received codeword, and the plurality of parity coefficients by the plurality of parity symbols in the received codeword, e.g., as described below.

In some demonstrative embodiments, processor 146 may be configured to respectively multiply the first plurality of coefficients of the plurality of coefficients by the first plurality of symbols in the odd positions in the received codeword, and the second plurality of coefficients of the plurality of coefficients by the second plurality of symbols in even positions in the received codeword, e.g., as described below.

In some demonstrative embodiments, one plurality of coefficients of the first and second pluralities of coefficients may include the decreasing arithmetic sequence, and another plurality of coefficients of the first and second pluralities of coefficients may include the increasing arithmetic sequence, e.g., as describe below.

Figure 3:
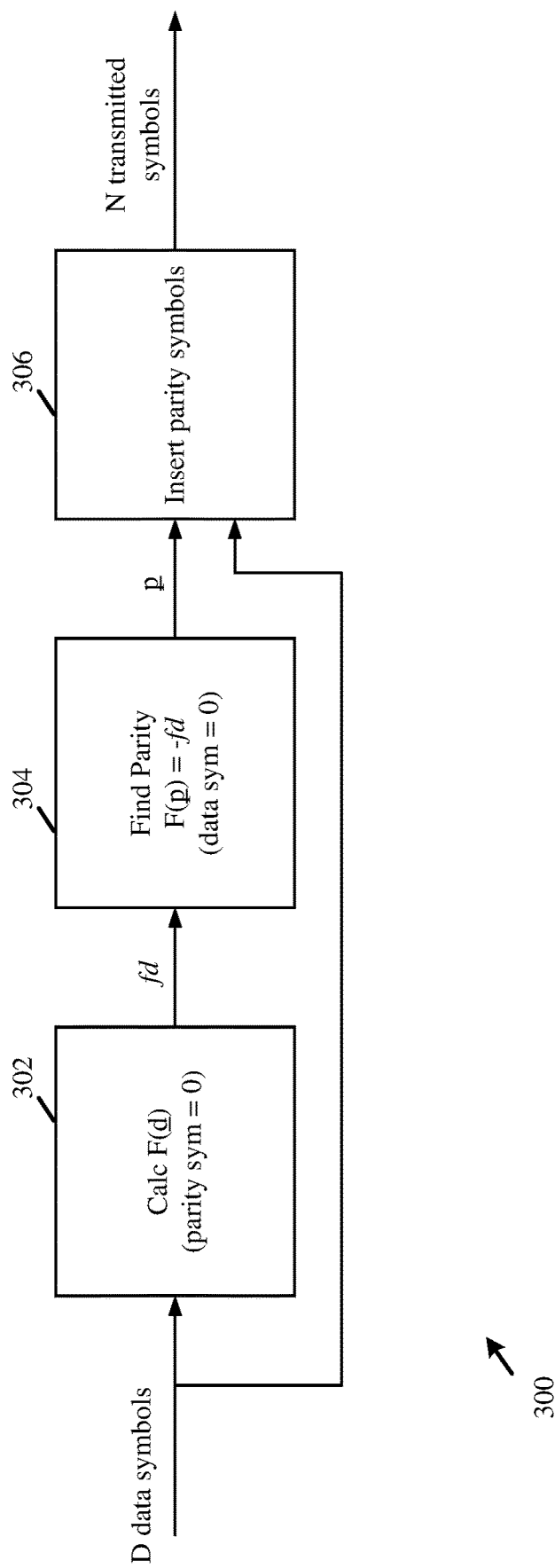
FIG. 3 is a schematic illustration of an encoding scheme, in accordance with some demonstrative embodiments.

Reference is made to FIG. 3, which schematically illustrates an encoding scheme 300, in accordance with some demonstrative embodiments.

In some demonstrative embodiments, encoder 122 (FIG. 1) and/or processor 126 (FIG. 1) may be implement one or more functionalities of encoding scheme 300 to encode the data for transmission 135 (FIG. 1) modulated according to the DM scheme.

In some demonstrative embodiments, encoding scheme 300 may be based on a parity function including a modulo operation, e.g., as described below.

In some demonstrative embodiments, the modulo operation may be based on modulo codes, e.g., as described below.

In one example, the modulo codes may be effective for communication channels having a reduced number of errors, e.g., where symbol values may change to neighboring values.

In another example, the modulo codes may be effective for hard-decision receivers, e.g., where an Analog to digital (A2D) resolution may match a modulation scheme.

In some demonstrative embodiments, the modulo codes may be based on a linear parity function, denoted F(x), which may be defined e.g., as follows:

$$F(x) = \mod\left(\sum_{n=1}^{N} a_n \cdot x_n, P\right) \quad (1)$$

wherein $a_n$ denotes a plurality of coefficients, which may be selected, for example, in a way that each different error may result in a different outcome of the linear parity function F(x).

In some demonstrative embodiments, a plurality of parity symbols may be selected, for example, such that a result of the linear parity function F(x) may be equal to a predefined no-error parity value, e.g., zero, at a transmitter side, e.g., F(x)=0.

In one example, considering a symbol alphabet of 0-to-9, where a possible error may be (+1) or (−1), e.g., a value of '3' may change to a value of '4' or '2' due to noise, but may not change to a value of '6' or '1'. According to this example, in order to protect three data symbols, the following parity-function F(x) may be defined:

$$F(x)=\mod(x_p+2x_{d_1}+3x_{d_2}+4x_{d_3}, 10) \quad (2)$$

wherein $x_p$ denotes a parity symbol, which may be determined, for example, by the transmitter side, such that a result of the parity-function F(x) may be equal to a pre-defined no-error parity value, e.g., F(x)=0 or any other value.

In some demonstrative embodiments, a receiver may detect a single error in any symbol of the 4 symbols, e.g., both (+1) or (−1) errors, for example, by determining a result of the parity function F(x).

In one example, when the result of the parity function F(x) is equal to 2, the receiver may determine a (+1) error in the second symbol.

In another example, when the result of the parity function F(x) is equal to 7, the receiver may determine a (−1) error in the third symbol.

In some demonstrative embodiments, a count of data symbols, denoted D, in a codeword having a total of N symbols may be based, for example, on a code rate, denoted D/N, of the codeword and a count of possible values per data symbol, denoted S, e.g., as described below.

In one example, the codeword may include, for example, a total of N symbols including the D data symbols and a count of parity symbols, denoted P, e.g., N=D+P. According to this example, the code rate D/N may be defined by the answer to the question "How many total symbols N can be transmitted for a given count of the parity symbols P".

In some demonstrative embodiments, a count of symbols N that can be transmitted for a given count of the parity symbols P may be determined, e.g., as follows:

$$N \leq \frac{S^P + 1}{4} \quad (3)$$

wherein a number of different error possibilities may be defined as 4N−2.

In one example, the count S of possible values per data symbol may be equal to 8. According to this example, the total number of N symbols and the count of the parity symbols P may be defined, e.g., as follows:

$$[N,P]=[2,16],[3,128],[4,1024] \quad (4)$$

In some demonstrative embodiments, a transmitter and a receiver transmitter may communicate a transmission, for example, according to the transmitter parity function F(x), which may provide a plurality of different parity values corresponding the plurality of two-symbol DM errors and the plurality of one-symbol DM errors.

In one example, transmitter 120 (FIG. 1) and receiver 140 (FIG. 1) may be configured to communicate transmission 135 (FIG. 1), for example, according to the transmitter parity function F(x), which may provide the plurality of different parity values corresponding the plurality of two-symbol DM errors and the plurality of one-symbol DM errors.

In one example, the transmitter parity function F(x) may provide the plurality of different parity values to ensure that a receiver, e.g., receiver 140 (FIG. 1), may be able to distinguish between different errors. For example, the transmitter parity function F(x) may provide a different outcome for every supported error, e.g., the two-symbol DM errors and/or the one-symbol DM errors.

In some demonstrative embodiments, the transmitter parity function F(x) may be defined, e.g., as follows:

$$F(x) = \mod\left(\sum_{n=1}^{N} a_n \cdot x_n, 4N\right) \quad (5)$$

$$a_n = \begin{cases} 2N - \dfrac{n+1}{2} & n \text{ is odd} \\ N + \dfrac{n}{2} - 1 & n \text{ is even} \end{cases}$$

In some demonstrative embodiments, the transmitter may be configured to select values of the parity symbols, such that a result of the parity function F(x) may be equal to a predefined no-error parity value, e.g., zero or any other predefined value.

In some demonstrative embodiments, the parity function F(x) may result in a different number from 0 to 4N−1, for example, for every different type of error at every different possible position, e.g., the two-symbol DM errors and/or the one-symbol DM errors.

In some demonstrative embodiments, the coefficients $a_n$ of the parity function F(x) may be determined, for example, to ensure that the parity function F(x) may provide the different outcome for every supported error, e.g., the two-symbol DM errors and/or the one-symbol DM errors.

In some demonstrative embodiments, the receiver, e.g., receiver 140 (FIG. 1), may receive a received transmission based on the transmission from the transmitter, and may apply the parity function F(x) to determine a decoded parity value, denoted F(y), for a codeword in the received transmission. For example, the decoded parity value F(y) may be determined based on the transmitter parity function F(x), for example, using the modulo operation and the coefficients $a_n$ of the parity function F(x).

In some demonstrative embodiments, when a one-symbol DM error occurs in the codeword in the received transmission the decoder parity value F(y) may include the following decoder parity value:

$$F(y) = \pm a_k \quad (6)$$

wherein K denotes the position of the one-symbol DM error, and a sign of the one-symbol DM error may be a sign of F(y)*; wherein F(y) * denotes a modulo function, which may provide numbers from a range between 0 to 4N−1, while a first half of the range, e.g., 1:2N−1, may be considered as positive numbers, and a second half of the range, e.g., 2N:4N−1, may be considered as negative numbers.

In some demonstrative embodiments, when a two-symbol DM error occurs in the codeword in the received transmission, the decoder parity value F(y) may be determined follows:

$$F(y) = \pm a_k \mp a_{k+1} \quad (7)$$

wherein K denotes the position of the one-symbol DM error and the sign of the two-symbol DM error may be a sign of F(y)*.

In one example, the count S of possible values per data symbol may be equal to 8, the count of the parity symbols P may be equal to 2, and, accordingly, the total number N of symbols may be equal to 4. According to this example, the parity function F(x), may be determined, e.g., as follows:

$$F(x) = \mathrm{mod}\left(\sum_{n=1}^{4} a_n \cdot x_n, 16\right) \quad (8)$$

According to this example, the coefficients $a_n$ may be determined, e.g., $a_n$=[7 4 6 5], and the code rate may be 50%.

According to this example, an errorless receiver parity value F(y) may be zero, e.g., F(y)=0.

According to this example, a single positive one-symbol DM error in a first symbol $x_1$ in the codeword, may cause the receiver parity value F(y) to be a value of seven, e.g., F(y)=7.

According to this example, a single negative one-symbol DM error in the first symbol $x_1$ in the codeword, may cause the receiver parity value F(y) to be a value of nine, e.g., F(y)=9, which is the same as the value (−7).

According to this example, a single negative one-symbol DM error in the second, third and fourth symbol in the codeword, may cause the receiver parity value F(y) to have values of ±4, ±6, and ±7, respectively.

According to this example, a two-symbol DM error in the first symbol $x_1$ and the second symbol $x_2$ of (+1, −1) may cause the receiver parity value F(y) to have a value of three, e.g., F(y)=7−4=3.

According to this example, a two-symbol DM error in the first symbol $x_1$ and the second symbol $x_2$ of (−1, +1) may cause the receiver parity value F(y) to be minus three, e.g., F(y)=4−7=−3.

According to this example, a two-symbol DM error in the second symbol $x_2$ and the third symbol $x_3$, and a two-symbol DM error in the third symbol $x_3$ and the fourth symbol $x_4$ may cause the receiver parity value F(y) to have values of ±2, ±1, respectively.

According to this example, all possible errors of the two-symbol DM errors and the one-symbol DM errors may result in different values of the receiver parity value F(y), and therefore the receiver may be able to detect and correct the errors.

In another example, the count S of possible values per data symbol may be equal to 8, the count of the parity symbols P may be equal to 2, and, accordingly, the total number N of symbols may be equal to 16. According to this example, the parity function F(x), may be determined, e.g., as follows:

$$F(x) = \mathrm{mod}\left(\sum_{n=1}^{16} a_n \cdot x_n, 64\right) \quad (9)$$

According to this example, an errorless receiver parity value F(y) may be defined as zero, e.g., F(y)=0, or any other value.

According to this example, the coefficients $a_n$ may be determined, e.g., $a_n$=[31 16 30 17 29 18 28 19 27 20 26 21 25 22 24 23], and the code rate may be 87.5%. For example, the coefficients $a_n$ may include different numbers between 16 to 31.

According to this example, a single positive one-symbol DM error in the codeword, may cause the receiver parity value F(y) to have values between 16 to 31, e.g., based on a position of the single positive one-symbol DM error in the codeword.

According to this example a single negative one-symbol DM error in the codeword, may cause the receiver parity value F(y) to have values between −16 to −31, e.g., based on a position of the single negative one-symbol DM error in the codeword.

According to this example, a single two-symbol DM error in the codeword, may cause the receiver parity value F(y) to have values between −15 to +15, e.g., based on a position of the single two-symbol DM error in the codeword, and signs of the single two-symbol DM error.

In some demonstrative embodiments, the parity symbol positions may be selected from the plurality of coefficients $a_n$, e.g., as describe below.

In one example, the data symbols may be provided to the transmitter, while values of the parity symbols may be chosen by the transmitter, e.g., transmitter 120 (FIG. 1).

In some demonstrative embodiments, the transmitter, e.g., transmitter 120 (FIG. 1) may select the values of the parity symbols such that the parity function F(x) may be equal to zero, e.g., F(x)=0, or to any other no-error parity value.

In some demonstrative embodiments, the parity symbol positions may be selected from the plurality of coefficients $a_n$, for example, to ensure that for every input of data-symbols, it may be possible to ensure that the parity function F(x) may be equal to the predefined no-error parity value, e.g., F(x)=0.

In one example, there may be limited number of number-value combinations to put in the parity symbols, e.g. $S^P$. According to this example, the selected coefficients for the parity symbols, which may be multiplied by the parity values, may be configured to ensure that, for example, for every input of the data symbols, the selected coefficients, when multiplied, by the parity values, may provide a result such that the parity function F(x) may be equal to the no-error parity value, e.g., zero.

In some demonstrative embodiments, for an input of the plurality of D data symbols, the transmitter, e.g., transmitter 120 (FIG. 1), may determine a first result, denoted $f_d$, for example, by applying a first modulo function to the plurality of data symbols, e.g., as follows:

$$\mod\left(\sum_{n\in dataonly} a_n \cdot x_n, 4N\right) \triangleq f_d \tag{10}$$

In some demonstrative embodiments, the transmitter, e.g., transmitter 120 (FIG. 1), may determine the plurality of parity symbols, for example, such that a second result of a second modulo function applied to the plurality of parity symbols may be an additive inverse of the first result $f_d$, e.g., $-f_d$, for example, to ensure that the parity function F(x) is equal to zero, e.g., as follows:

$$\mod\left(\sum_{n\in parityonly} a_n \cdot x_n, 4N\right) = -f_d \tag{11}$$

In some demonstrative embodiments, the first result $f_d$ may include any suitable number in a possible range of the divisor of the modulo function, e.g., from 0 to 4N−1.

In some demonstrative embodiments, the parity coefficients, which may be multiplied by the parity values, may be selected, for example, to ensure that any number in the possible range of the divisor, e.g., modulo 4N, may be generated.

In some demonstrative embodiments, to ensure generating any number within the range of the divisor of the modulo operation, e.g., any number from 0 to 4N−1, the parity-coefficients ($a_{q_1}$ ... $a_{q_P}$) may be defined to meet some or all of the following criteria:

- The first parity-coefficient $a_{q_1}$ and the count of possible values per data symbol S are coprime;
- A modulo of the next parity-coefficient $a_{q_n}$ and the count of possible values per data symbol S are equal to zero, and the next parity-coefficient $a_{q_n}$ and the count of possible values per data symbol S are coprime, e.g.,
  mod ($a_{q_2}$, S)=0 AND $a_{q_2}$ and $S^2$ are coprime
  mod ($a_{q_3}$, $S^2$)=0 AND $a_{q_3}$ and $S^3$ are coprime
  ...

In other embodiments, any other additional or alternative criteria may be implemented.

In some demonstrative embodiments, the transmitter, e.g., transmitter 120 (FIG. 1), may be configured to utilize a Look Up Table (LUT) or a calculation, e.g., an iterative calculation, to determine the plurality of parity symbols, for example, according to the first result $f_d$.

In some demonstrative embodiments, the transmitter, e.g., transmitter 120 (FIG. 1), may be configured to position the plurality of parity symbols inside the codeword, e.g., in their pre-defined places.

In some demonstrative embodiments, encoding scheme 300 may be configured to encode the codeword by determining the plurality of parity symbols, for example, to ensure that the parity function F(x) may be equal to zero, e.g., as described below.

In some demonstrative embodiments, as indicated at block 302, encoding scheme 300 may include determining the first result $f_d$, for example, by applying the first modulo function to the plurality of data symbols. For example, encoder 124 (FIG. 1) and/or processor 126 (FIG. 1) may determine the data result, $f_d$, for example, by applying the first modulo function to the plurality of data symbols.

In some demonstrative embodiments, as indicated at block 304, encoding scheme 300 may include determining the plurality of parity symbols such that the second result— $f_d$ of the second modulo function applied to the plurality of parity symbols may be the additive inverse of the data result $f_d$. For example, encoder 124 (FIG. 1) and/or processor 126 (FIG. 1) may determine the plurality of parity symbols such that the parity result $-f_d$ of the second modulo function applied to the plurality of parity symbols may be the additive inverse of the data result $f_d$.

In some demonstrative embodiments, as indicated at block 306, encoding scheme 300 may include inserting the plurality of parity symbols, e.g., at the predefined parity locations. For example, encoder 124 (FIG. 1) and/or processor 126 (FIG. 1) may insert the plurality of parity symbols at the predefined parity locations.

Figure 4:
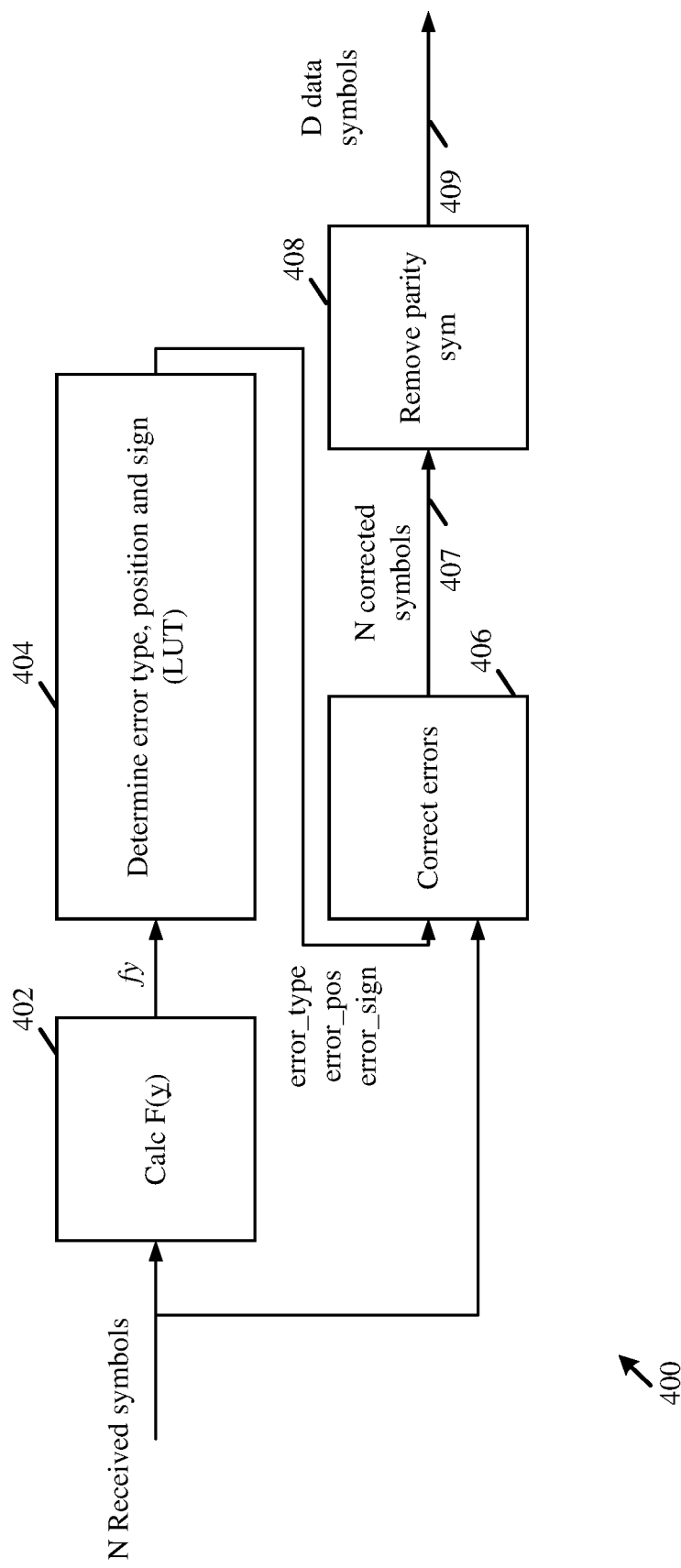
FIG. 4 is a schematic illustration of a decoding scheme, in accordance with some demonstrative embodiments.

Reference is made to FIG. 4, which schematically illustrates a decoding scheme 400, in accordance with some demonstrative embodiments.

In some demonstrative embodiments, a decoder, e.g., decoder 144 (FIG. 1) and/or processor 146 (FIG. 1), may be configured to implement one or more functionalities of decoding scheme 400 to decode the received codeword from transmission 135 (FIG. 1) modulated according to the DM scheme.

In some demonstrative embodiments, the decoder, e.g., decoder 144 (FIG. 1), may be configured to determine the decoder parity value F(y) of the parity function F(x).

In one example, the decoder may be configured to determine an error type, e.g., one-symbol DM error or two-symbol DM error, an error sign of a one-symbol DM error, and/or an error position, for example, based on the decoder parity value F(y), For example, according to the following Table:

TABLE 1

| | Error type | Error sign | Error position |
|---|---|---|---|
| F(y) = 0 | No errors | | |
| abs(F(y)) ≥ 2N | one-symbol error | Sign(F(y)) | k ∣ $a_k$ = abs(F(y)) |
| abs(F(y)) < 2N | Two-symbol error | | N − F(y) and N − F(y) + 1 |

In one example, it may be assumed that values of the parity function F(x) may be in the range between (−2N) and (2N−1).

In another example, any other definition may be used to determine the error type, the error sign, and/or the error position based on the decoder parity value F(y).

In one example, the decoder, e.g., decoder 144 (FIG. 1), may be configured to determine a sign of a first error of the two-symbol DM error, and a sign of the second error of the two-symbol DM error, for example, based on the decoder parity value F(y), for example, according to the following Table:

TABLE 2

| | F(y) > 0 | F(y) < 0 |
|---|---|---|
| N − abs(F(y)) is odd | +/− | −/+ |
| N − abs(F(y)) is even | −/+ | +/− |

In another example, any other definition may be used to determine the error sign of the two-symbol DM error based on the decoder parity value F(y).

In some demonstrative embodiments, decoding scheme 400 may be configured to identify a possible error in a received codeword, to correct the possible error, and to output corrected data symbols, e.g., as described below.

In some demonstrative embodiments, as indicated at block 402, decoding scheme 400 may include determining the decoder parity value F(x), for example, by applying the parity function F(x). For example, decoder 144 (FIG. 1) and/or processor 146 (FIG. 1) may determine the decoder parity value F(y).

In some demonstrative embodiments, as indicated at block 404, decoding scheme 400 may include determining an error type, e.g., a one-symbol DM error or a two-symbol DM error, an error sign, and an error position of a possible error, for example, based on the decoder parity value F(y). For example, decoder 144 (FIG. 1) and/or processor 146 (FIG. 1) may determine the error type, the error sign and the error position of a possible error, for example based on the decoder parity value, for example, according to Table 1 and/or Table 2.

In some demonstrative embodiments, as indicated at block 406, decoding scheme 400 may include correcting a detected error and outputting a plurality of N corrected symbols 407. For example, decoder 144 (FIG. 1) and/or processor 146 (FIG. 1) may correct the detected error, and may output the plurality of N corrected symbols 407.

In some demonstrative embodiments, as indicated at block 408, decoding scheme 400 may include removing the parity symbols from the plurality of N corrected symbols 407 and outputting corrected data symbols 409. For example, decoder 144 (FIG. 1) and/or processor 146 (FIG. 1) may remove the parity symbols from the plurality of N corrected symbols 407 and may output the corrected data symbols 409.

Figure 5:
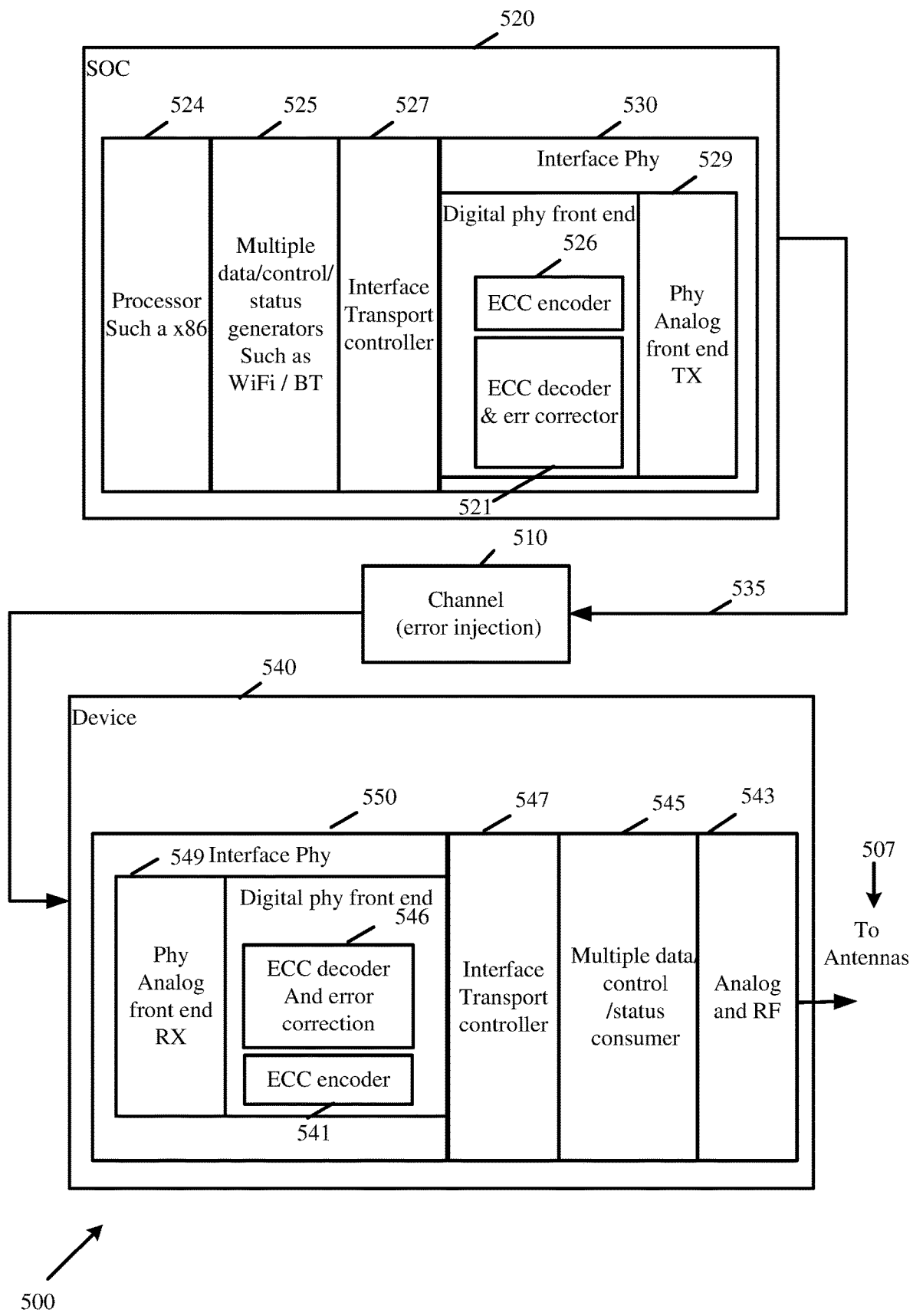
FIG. 5 is a schematic block diagram illustration of a system, in accordance with some demonstrative embodiments.

Reference is made to FIG. 5, which schematically illustrates a block diagram of a system 500, in accordance with some demonstrative embodiments. For example, device 102 may include one or more components, elements, and/or blocks, of system 500.

In some demonstrative embodiments, as shown in FIG. 5, system 500 may include a SoC 520, a device 540, and a communication interface 510 to communicate a transmission modulated according to a DM scheme, e.g., transmission 135 (FIG. 1), between SoC 520 and device 540. For example, transmitter 120 (FIG. 1), may include one or more elements of SoC 520, and/or may perform one or more operations and/or functionalities of SoC 520; receiver 140 (FIG. 1), may include one or more elements of device 540, and/or may perform one or more operations and/or functionalities of device 540; and/or communication interface 110 (FIG. 1), may include one or more elements of communication interface 510, and/or may perform one or more operations and/or functionalities of communication interface 510.

In one example, SoC 520 may include, for example, a processing unit, and/or device 540 may include, for example, a wireless network interface device, e.g., a Wireless Network Interface Card (WNIC), e.g., wireless communication unit 130 (FIG. 1).

In other example, SoC 520 may include, or may be implemented as part of, any other device, and/or device 540 may include, or may be implemented as part of, any other device.

In some demonstrative embodiments, as shown in FIG. 5, SoC 520 may generate and/or provide data, for example, based on inputs from one or more applications.

In some demonstrative embodiments, as shown in FIG. 5, SoC 520 may include a processor 524, e.g., processor 124 (FIG. 1), to process the data.

In some demonstrative embodiments, as shown in FIG. 5, SoC 520 may include a plurality of generators 525, for example, WiFi and/or BT generators, to process the data for transmission.

In some demonstrative embodiments, as shown in FIG. 5, SoC 520 may include an interface transport controller 527 to process the data for transport.

In some demonstrative embodiments, as shown in FIG. 5, SoC 520 may include a PHY interface 530 configured to process the data for transmission according to the DN scheme.

In some demonstrative embodiments, as shown in FIG. 5, PHY interface 530 may include a digital PHY including an encoder 526 to encode the data for transmission, which may be modulated according to the DM scheme. For example, encoder 126 (FIG. 1) may include one or more elements of encoder 526, and/or may perform one or more operations and/or functionalities of encoder 526.

In some demonstrative embodiments, as shown in FIG. 5, the PHY interface 530 may include an analog PHY 529 to transmit the transmission 535 to device 540, for example, via communication interface 510.

In some demonstrative embodiments, as shown in FIG. 5, a received transmission based on the transmission from SOC may be received by device 540.

In some demonstrative embodiments, as shown in FIG. 5, device 540 may include a PHY interface 550 to process the received transmission.

In some demonstrative embodiments, as shown in FIG. 5, the PHY interface 550 may include an analog PHY to perform an analog processing of the received transmission.

In some demonstrative embodiments, as shown in FIG. 5, PHY interface 550 may include a digital PHY including a decoder 546 to decode the received transmission. For example, decoder 146 (FIG. 1) may include one or more elements of decoder 546, and/or may perform one or more operations and/or functionalities of decoder 546.

In some demonstrative embodiments, as shown in FIG. 5, device 540 may include an interface transport controller 547 to transport the received transmission may be processed by, for example, after decoding and error correction of the received transmission.

In some demonstrative embodiments, as shown in FIG. 5, device 540 may include a plurality of generators 545 to process the received transmission, for example, WiFi and/or BT generators.

In some demonstrative embodiments, as shown in FIG. 5, device 540 may include analog and RF circuitry 543 to process the received transmission, for example, for wireless communication. For example, radio 134 (FIG. 1) may include one or more elements of analog and RF circuitry 543.

In some demonstrative embodiments, as shown in FIG. 5, the data in the received transmission may be processed and provided to antennas 507 for wireless transmission.

In some demonstrative embodiments, device 540 may include an encoder 541, and SoC may include a decoder 521, for example, to process data from device 540, e.g., which may include data received in one or more wireless communications via antennas 507. For example, encoder 541 may perform the functionality of encoder 124 (FIG. 1); and/or decoder 521 may perform the functionality of decoder 144 (FIG. 1).

Figure 6:
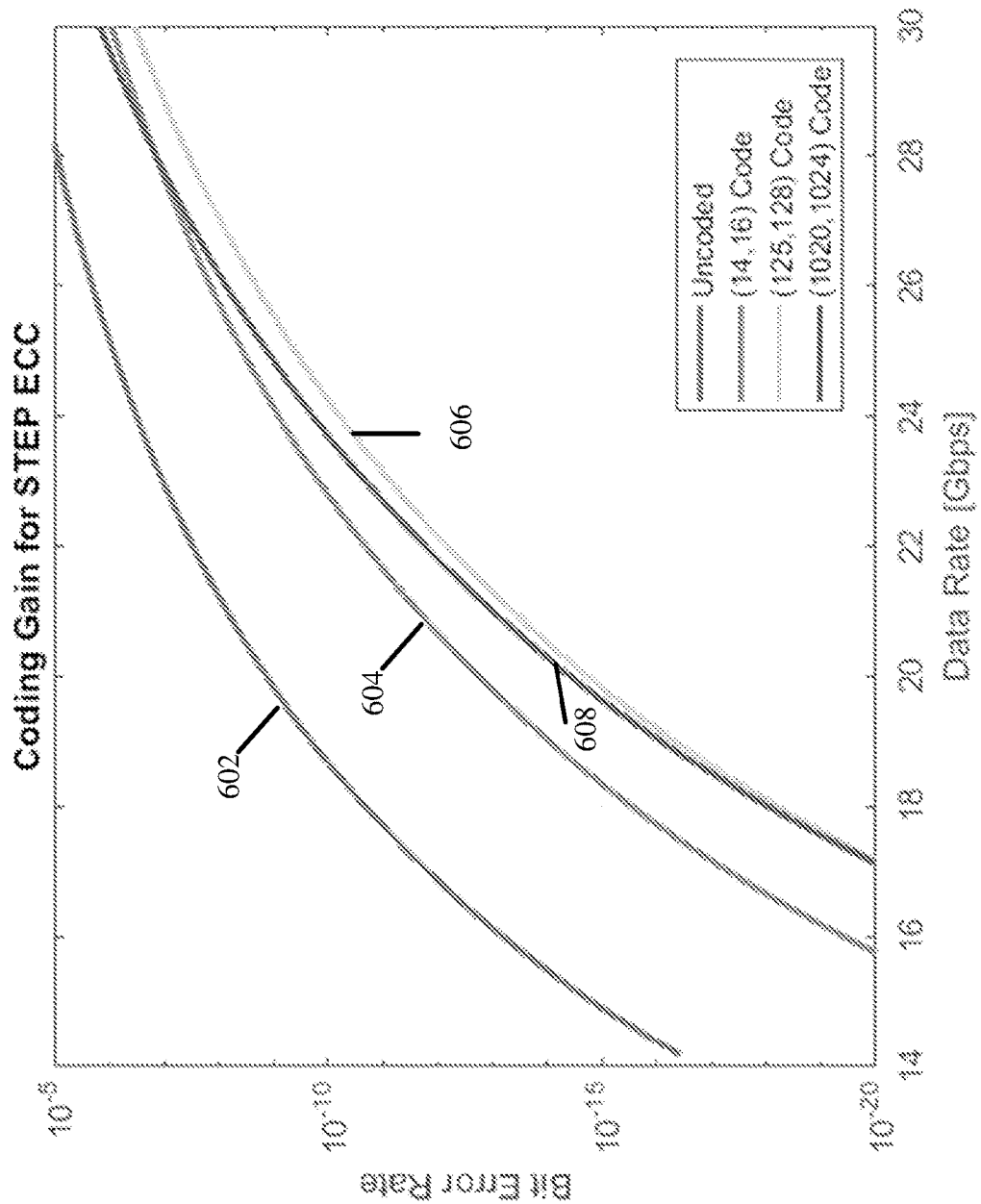
FIG. 6 is a schematic illustration of a graph depicting Bit Error Rates (BER) versus data rates with respect to a plurality of codes, in accordance with some demonstrative embodiments.

Reference is made to FIG. 6, which schematically illustrates a graph depicting Bit Error Rates (BER) versus data rates for a plurality of codes, in accordance with some demonstrative embodiments.

In some demonstrative embodiments, a curve 602 depicts BER versus data rates of an uncorded transmission.

In some demonstrative embodiments, a curve 604 depicts BER versus data rates of a first encoded transmission, e.g., according to an ECC scheme, for example, including codewords of 16 symbols including 2 parity symbols and 14 data symbols.

In some demonstrative embodiments, a curve 606 depicts a BER versus data rates of a second encoded transmission, e.g., according to an ECC scheme, for example, including codewords of 128 symbols including 3 parity symbols and 125 data symbols.

In some demonstrative embodiments, a curve 608 depicts BER versus data rates of a third encoded transmission, e.g., according to an ECC scheme, for example, including codewords of 1024 symbols including 4 parity symbols and 1120 data symbols.

In some demonstrative embodiments, as shown in FIG. 6, encoding a transmission according to the ECC schemes described herein may support an increased data rate of the transmission.

In some demonstrative embodiments, as shown in FIG. 6, for a system requirement of BER=1e-12, a coding gain of the first encoded transmission may allow to increase the data rate from 17 Gbps to 20 Gbps.

In some demonstrative embodiments, as shown in FIG. 6, for a system requirement of BER=1e-12, a coding gain of the second encoded transmission may allow to increase the data rate from 17 Gbps to 22 Gbps.

In some demonstrative embodiments, as shown in FIG. 6, encoding a transmission may improve BER, for example, even at any data rate.

In some demonstrative embodiments, as shown in FIG. 6, for a system requirement of 20 Gbps, the BER of the first encoded transmission may be improved from 1e-9 to 1e-13.

In some demonstrative embodiments, as shown in FIG. 6, for a system requirement of 20 Gbps, the BER of the second encoded transmission may be improved from 1e-9 to almost 1e-13.

Reference is made to FIG. 7, which schematically illustrates a method of encoding data for a transmission modulated according to a DM scheme. For example, one or more operations of the method of FIG. 7 may be performed by one or more elements of a device, e.g., device 102 (FIG. 1), a transmitter, e.g., transmitter 120 (FIG. 1), a processor, e.g., processor 126 (FIG. 1), and/or an encoder, e.g., encoder 124 (FIG. 1).

As indicated at block 702, the method may include encoding data for a transmission modulated according to a DM scheme into a plurality of codewords, a codeword of the plurality of codewords including a plurality of symbols including a plurality of data symbols and a plurality of parity symbols. For example, processor 126 (FIG. 1) may encode into the plurality of codewords the data for transmission 135 (FIG. 1) modulated according to the DM scheme, e.g., as described above.

As indicated at block 704, encoding the data for the transmission modulated according to the DM scheme may include determining the plurality of parity symbols based on a parity function applied to the plurality of symbols, the parity function configured to provide a plurality of different parity values corresponding to a respective plurality of possible errors in the plurality of symbols, the plurality of possible errors including a plurality of two-symbol DM errors and a plurality of one-symbol DM errors, wherein a two-symbol DM error of the plurality of two-symbol DM errors including a first error corresponding to a first symbol and a second error corresponding to a second symbol adjacent to the first symbol, wherein a sign of the first error is opposite to a sign of the second error. For example, processor 126 (FIG. 1) may determine the plurality of parity symbols based on the parity function applied to the plurality of symbols, e.g., as described above.

As indicated at block 706, the method may include outputting the plurality of codewords. For example, processor 126 (FIG. 1) may output the plurality of codewords via output 128 (FIG. 1), e.g., as described above.

Figure 8:
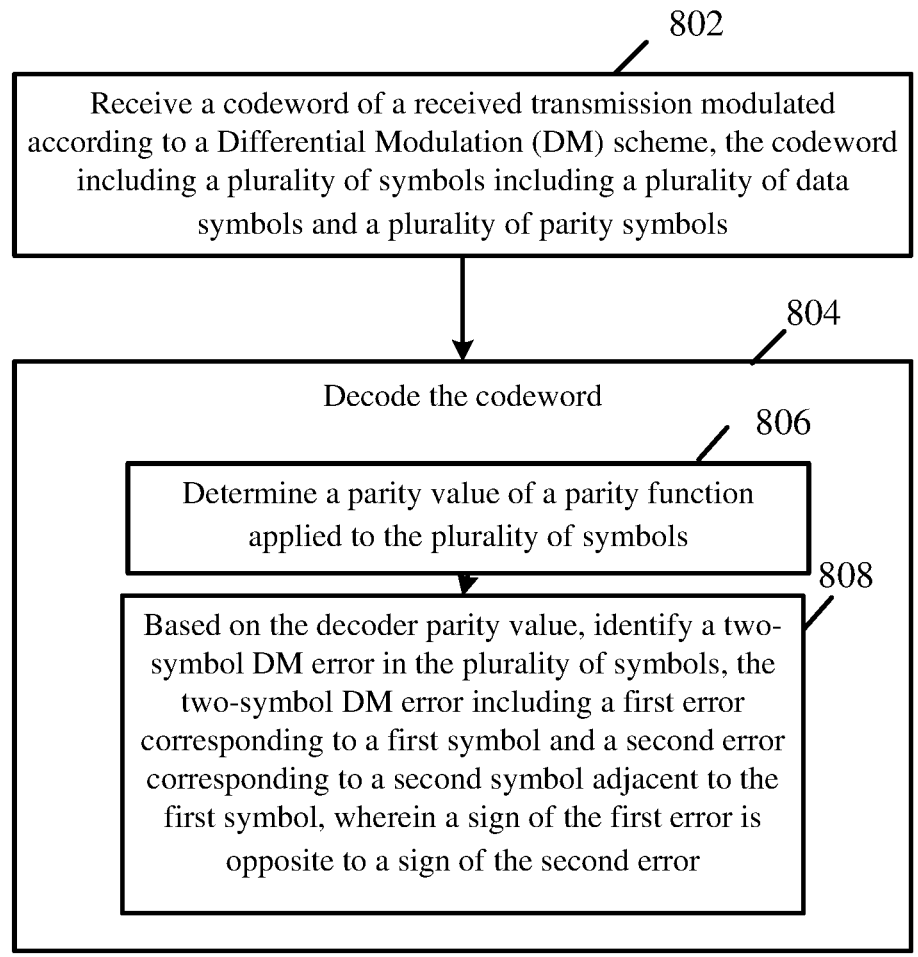
FIG. 8 is a schematic flow-chart illustration of a method of decoding a codeword of a received transmission modulated according to a DM scheme, in accordance with some demonstrative embodiments.

Reference is made to FIG. 8, which schematically illustrates a method of decoding a codeword of a received transmission modulated according to a DM scheme. For example, one or more operations of the method of FIG. 8 may be performed by one or more elements of a device, e.g., device 102 (FIG. 1), a receiver, e.g., receiver 140 (FIG. 1), a processor, e.g., processor 146 (FIG. 1), and/or a decoder, e.g., decoder 144 (FIG. 1).

As indicated at block 802, the method may include receiving a codeword of a received transmission modulated according to a DM scheme, the codeword including a plurality of symbols including a plurality of data symbols and a plurality of parity symbols. For example, processor 146 and/or input 148 (FIG. 1) may receive the codeword of the received transmission modulated according to the DM scheme, the codeword including the plurality of symbols including the plurality of data symbols and the plurality of parity symbols, e.g., as described above.

As indicated at block 804, the method may include decoding the codeword. For example, processor 146 and/or decoder 144 (FIG. 1) may decode the codeword, e.g., as described above As indicated at block 806, decoding the codeword may include determining a parity value of a parity function applied to the plurality of symbols. For example, processor 146 and/or decoder 144 (FIG. 1) may determine the parity value of the parity function applied to the plurality of symbols, e.g., as described above.

As indicated at block 808, decoding the codeword may include, identifying, based on the decoder parity value, a two-symbol DM error in the plurality of symbols, the two-symbol DM error including a first error corresponding to a first symbol and a second error corresponding to a second symbol adjacent to the first symbol, wherein a sign of the first error is opposite to a sign of the second error. For example, processor 146 and/or decoder 144 (FIG. 1) may identify a two-symbol DM error in the plurality of symbols based on the decoder parity value, e.g., as described above.

Figure 9:
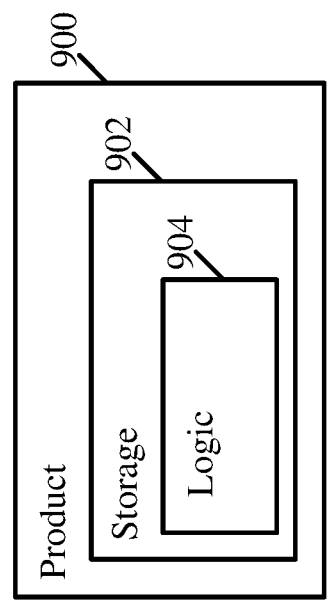
FIG. 9 is a schematic illustration of a product of manufacture, in accordance with some demonstrative embodiments.

Reference is made to FIG. 9, which schematically illustrates a product of manufacture 900, in accordance with some exemplary embodiments. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at device 102 (FIG. 1), transmitter 120 (FIG. 1), receiver 140 (FIG. 1), processor 126 (FIG. 1), processor 146 (FIG. 1), encoder 124 (FIG. 1) and/or decoder 144 (FIG. 1), to cause device 102 (FIG. 1), transmitter 120 (FIG. 1), receiver 140 (FIG. 1), processor 126 (FIG. 1), processor 146 (FIG. 1), encoder 124 (FIG. 1) and/or decoder 144 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7 and/or 8, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 900 and/or machine-readable storage media 902 may include one or more types of computer-readable storage media capable of storing data, including volatile memory, non-volatile memory, removable or non-removable memory, erasable or non-erasable memory, writeable or re-writeable memory, and the like. For example, machine-readable storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, a Solid State Drive (SSD), an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 includes an apparatus comprising an encoder configured to encode data for a transmission modulated according to a Differential Modulation (DM) scheme, the encoder comprising a processor configured to encode the data into a plurality of codewords, a codeword of the plurality of codewords comprising a plurality of symbols comprising a plurality of data symbols and a plurality of parity symbols, the processor configured to determine the plurality of parity symbols based on a parity function applied to the plurality of symbols, the parity function configured to provide a plurality of different parity values corresponding to a respective plurality of possible errors (e.g., "predefined errors", "predetermined errors", "potential errors", "hypothetical errors", or "theoretical errors") in the plurality of symbols, the plurality of possible errors comprising a plurality of two-symbol DM errors and a plurality of one-symbol DM errors, wherein a two-symbol DM error of the plurality of two-symbol DM errors comprises a first error corresponding to a first symbol and a second error corresponding to a second symbol adjacent to the first symbol, wherein a sign of the first error is opposite to a sign of the second error; and an output to output the plurality of codewords.

Example 2 includes the subject matter of Example 1, and optionally, wherein the processor is configured to determine the plurality of parity symbols such that a result of the parity function is a predefined no-error parity value.

Example 3 includes the subject matter of Example 1 or 2, and optionally, wherein the processor is configured to determine a first result by applying a first modulo function to the plurality of data symbols, and to determine the plurality of parity symbols such that a second result of a second modulo function applied to the plurality of parity symbols is an additive inverse of the first result.

Example 4 includes the subject matter of any one of Examples 1-3, and optionally, wherein the parity function comprises a modulo operation applied to a sum of a plurality of products of a plurality of coefficients respectively multiplied by the plurality of symbols.

Example 5 includes the subject matter of Example 4, and optionally, wherein the plurality of coefficients comprises a plurality of data coefficients and a plurality of parity coefficients, the plurality of data coefficients to be respectively multiplied by the plurality of data symbols, the plurality of parity coefficients to be respectively multiplied by the plurality of parity symbols.

Example 6 includes the subject matter of Example 5, and optionally, wherein a value of a parity coefficient of the plurality of parity coefficients is based on a count of possible values per data symbol.

Example 7 includes the subject matter of any one of Examples 4-6, and optionally, wherein the plurality of coefficients comprises a first plurality of coefficients and a second plurality of coefficients, the first plurality of coefficients to be respectively multiplied by a first plurality of symbols in odd positions, the second plurality of coefficients to be respectively multiplied by a second plurality of symbols in even positions, wherein the first plurality of coefficients is based on a first function, and the second plurality of coefficients is based on a second function different from the first function.

Example 8 includes the subject matter of Example 7, and optionally, wherein one plurality of coefficients of the first and second pluralities of coefficients comprises a decreasing arithmetic sequence, and another plurality of coefficients of the first and second pluralities of coefficients comprises an increasing arithmetic sequence.

Example 9 includes the subject matter of any one of Examples 4-8, and optionally, wherein a divisor of the modulo operation is based on four times a count of symbols in the plurality of symbols.

Example 10 includes the subject matter of any one of Examples 1-9, and optionally, wherein a particular parity value of the plurality of different parity values corresponding to a particular two-symbol DM error of the plurality of two-symbol DM errors is configured to identify a position of the particular two-symbol DM error, a sign of a first error of the particular two-symbol DM error, and a sign of a second error of the particular two-symbol DM error.

Example 11 includes the subject matter of any one of Examples 1-10, and optionally, wherein a particular parity value of the plurality of different parity values corresponding to a particular one-symbol DM error of the plurality of one-symbol DM errors is configured to identify a position of the particular one-symbol DM error, and a sign of the particular one-symbol DM error.

Example 12 includes the subject matter of any one of Examples 1-11, and optionally, wherein the plurality of different parity values comprises a first plurality of parity values to identify the plurality of one-symbol DM errors, respectively, and a second plurality of parity values to identify the plurality of two-symbol DM errors, respectively, wherein an absolute value of each of the first plurality of parity values is equal to or greater than a predefined value, and an absolute value of each of the second plurality of parity values is less than the predefined value.

Example 13 includes the subject matter of any one of Examples 1-12, and optionally, wherein a first parity value of the plurality of different parity values is to identify a first two-symbol DM error at a particular position in the codeword, and a second parity value of the plurality of different parity values is to identify a second two-symbol DM error at the particular position, wherein a sign of a first error of the first two-symbol DM error is opposite to a sign of a first error of the second two-symbol DM error, and a sign of a second error of the first two-symbol DM error is opposite to a sign of a second error of the second two-symbol DM error.

Example 14 includes the subject matter of Example 13, and optionally, wherein a third parity value of the plurality of different parity values is to identify a first one-symbol DM error at the particular position, and a fourth parity value of the plurality of different parity values is to identify a second one-symbol DM error at the particular position, a sign of the first one-symbol DM error is opposite to a sign of the second one-symbol DM error.

Example 15 includes the subject matter of any one of Examples 1-14, and optionally, wherein the plurality of two-symbol DM errors comprises all possible two-symbol DM errors in the codeword, and the plurality of one-symbol DM errors comprises all possible one-symbol DM errors in the codeword.

Example 16 includes the subject matter of any one of Examples 1-15, and optionally, wherein a count of symbols in the plurality of data symbols is based on a code rate of the codeword and a count of possible values per data symbol.

Example 17 includes the subject matter of any one of Examples 1-16, and optionally, wherein the DM scheme comprises a Pulse Width Modulation (PWM) scheme, wherein the first symbol corresponds to a first pulse in the transmission, and the second symbol corresponds to a second pulse in the transmission, the second pulse adjacent to the first pulse, wherein the two-symbol DM error corresponds to an edge-shift of an edge, which is shared between the first pulse and the second pulse.

Example 18 includes the subject matter of any one of Examples 1-16, and optionally, wherein the DM scheme comprises a differential Pulse amplitude Modulation (PAM) scheme.

Example 19 includes the subject matter of any one of Examples 1-18, and optionally, wherein the first error and the second error are $(-1, +1)$ or $(+1, -1)$.

Example 20 includes the subject matter of any one of Examples 1-19, and optionally, wherein a one-symbol DM error of the plurality of one-symbol DM errors comprises an error of $(-1)$ or $(+1)$.

Example 21 includes the subject matter of any one of Examples 1-20, and optionally, comprising a transmitter to transmit the transmission modulated according to the DM scheme.

Example 22 includes the subject matter of Example 21, and optionally, comprising a communication interface to communicate the transmission modulated according to the DM scheme; a receiver to process a received transmission based on the transmission modulated according to the DM scheme; and a decoder to decode a received codeword of the received transmission, the decoder configured to determine a decoder parity value of the parity function applied to a plurality of symbols of the received codeword, and, based on the decoder parity value, to identify a two-symbol DM error in the received codeword.

Example 23 includes apparatus comprising a decoder configured to decode a received transmission modulated according to a Differential Modulation (DM) scheme, the decoder comprising an input to receive a codeword of the received transmission, the codeword comprising a plurality of symbols comprising a plurality of data symbols and a plurality of parity symbols; and a processor configured to decode the codeword, the processor configured to determine a parity value of a parity function applied to the plurality of symbols, and, based on the parity value, to identify a two-symbol DM error in the plurality of symbols, the two-symbol DM error comprising a first error corresponding to a first symbol and a second error corresponding to a second symbol adjacent to the first symbol, wherein a sign of the first error is opposite to a sign of the second error.

Example 24 includes the subject matter of Example 23, and optionally, wherein the processor is configured to determine a position of the two-symbol DM error in the codeword, the sign of the first error, and the sign of the second error based on the parity value.

Example 25 includes the subject matter of Example 23 or 24, and optionally, wherein the parity function is configured to provide a plurality of different parity values to identify a respective plurality of possible errors, the plurality of possible errors comprising a plurality of two-symbol DM errors and a plurality of one-symbol DM errors.

Example 26 includes the subject matter of Example 25, and optionally, wherein a particular value of the plurality of different parity values corresponding to a particular two-symbol DM error of the plurality of two-symbol DM errors is configured to identify a position of the particular two-symbol DM error, a sign of a first error of the particular two-symbol DM error, and a sign of a second error of the particular two-symbol DM error.

Example 27 includes the subject matter of Example 25 or 26, and optionally, wherein a particular parity value of the plurality of different parity values corresponding to a particular one-symbol DM error of the plurality of one-symbol DM errors is configured to identify a position of the particular one-symbol DM error, and a sign of the particular one-symbol DM error.

Example 28 includes the subject matter of any one of Examples 25-27, and optionally, wherein the plurality of different parity values comprises a first plurality of parity values to identify the plurality of one-symbol DM errors, respectively, and a second plurality of parity values to identify the plurality of two-symbol DM errors, respectively, wherein an absolute value of each of the first plurality of parity values is equal to or greater than a predefined value, and an absolute value of each of the second plurality of parity values is less than the predefined value.

Example 29 includes the subject matter of any one of Examples 25-28, and optionally, wherein a first parity value of the plurality of different parity values is to identify a first two-symbol DM error at a particular position in the codeword, and a second parity value of the plurality of different parity values is to identify a second two-symbol DM error at the particular position, wherein a sign of a first error of the first two-symbol DM error is opposite to a sign of a first error of the second two-symbol DM error, and a sign of a second error of the first two-symbol DM error is opposite to a sign of a second error of the second two-symbol DM error.

Example 30 includes the subject matter of Example 29, and optionally, wherein a third parity value of the plurality of different parity values is to identify a first one-symbol DM error at the particular position, and a fourth parity value of the plurality of different parity values is to identify a second one-symbol DM error at the particular position, a sign of the first one-symbol DM error is opposite to a sign of the second one-symbol DM error.

Example 31 includes the subject matter of any one of Examples 25-30, and optionally, wherein the plurality of two-symbol DM errors comprises all possible two-symbol DM errors in the codeword, and the plurality of one-symbol DM errors comprises all possible one-symbol DM errors in the codeword.

Example 32 includes the subject matter of any one of Examples 23-31, and optionally, wherein the parity function comprises a modulo operation applied to a sum of a plurality of products of a plurality of coefficients respectively multiplied by the plurality of symbols.

Example 33 includes the subject matter of Example 32, and optionally, wherein the plurality of coefficients comprises a plurality of data coefficients and a plurality of parity coefficients, the plurality of data coefficients to be respectively multiplied by the plurality of data symbols, the plurality of parity coefficients to be respectively multiplied by the plurality of parity symbols.

Example 34 includes the subject matter of Example 33, and optionally, wherein a value of a parity coefficient of the plurality of parity coefficients is based on a count of possible values per data symbol.

Example 35 includes the subject matter of any one of Examples 32-34, and optionally, wherein the plurality of coefficients comprises a first plurality of coefficients and a second plurality of coefficients, the first plurality of coefficients respectively multiplied by a first plurality of symbols in odd positions, the second plurality of coefficients respectively multiplied by a second plurality of symbols in even positions, wherein the first plurality of coefficients is based on a first function, and the second plurality of coefficients is based on a second function different from the first function.

Example 36 includes the subject matter of Example 35, and optionally, wherein one plurality of coefficients of the first and second pluralities of coefficients comprises a decreasing arithmetic sequence, and another plurality of coefficients of the first and second pluralities of coefficients comprises an increasing arithmetic sequence.

Example 37 includes the subject matter of any one of Examples 32-36, and optionally, wherein a divisor of the modulo operation is based on four times a count of symbols in the plurality of symbols.

Example 38 includes the subject matter of any one of Examples 23-37, and optionally, wherein the processor is configured to determine the codeword is errorless when the parity value is a predefined no-error parity value.

Example 39 includes the subject matter of any one of Examples 23-38, and optionally, wherein a count of symbols in the plurality of data symbols is based on a code rate of the codeword and a count of possible values per data symbol.

Example 40 includes the subject matter of any one of Examples 23-39, and optionally, wherein the DM scheme comprises a Pulse Width Modulation (PWM) scheme, wherein the first symbol corresponds to a first pulse in the received transmission, and the second symbol corresponds to a second pulse in the received transmission, the second pulse adjacent to the first pulse, wherein the two-symbol DM error corresponds to an edge-shift of an edge, which is shared between the first pulse and the second pulse.

Example 41 includes the subject matter of any one of Examples 23-39, and optionally, wherein the DM scheme comprises a differential Pulse amplitude Modulation (PAM) scheme.

Example 42 includes the subject matter of any one of Examples 23-41, and optionally, wherein the first error and second error are (−1, +1) or (+1, −1).

Example 43 includes the subject matter of any one of Examples 23-42, and optionally, wherein the processor is configured to determine two corrected symbols based on the detected two-symbol DM error, and to output a decoded codeword comprising plurality of decoded data symbols corresponding to the codeword, the plurality of decoded data symbols based on the two corrected symbols.

Example 44 comprises an apparatus comprising means for executing any of the described operations of Examples 1-43.

Example 45 comprises a product comprising one or more tangible computer-readable non-transitory storage media comprising computer-executable instructions operable to, when executed by at least one processor, enable the at least one processor to cause a computing device to perform any of the described operations of Examples 1-43.

Example 46 comprises an apparatus comprising: a memory interface; and processing circuitry configured to: perform any of the described operations of Examples 1-43.

Example 47 comprises a method comprising any of the described operations of Examples 1-43.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   an encoder configured to encode data for a transmission modulated according to a Differential Modulation (DM) scheme, the encoder comprising:
   a processor configured to encode the data into a plurality of codewords, a codeword of the plurality of codewords comprising a plurality of symbols comprising a plurality of data symbols and a plurality of parity symbols, the processor configured to determine the plurality of parity symbols based on a parity function applied to the plurality of symbols, the parity function configured to provide a plurality of different parity values corresponding to a respective plurality of possible errors in the plurality of symbols, the plurality of possible errors comprising a plurality of two-symbol DM errors and a plurality of one-symbol DM errors, wherein a two-symbol DM error of the plurality of two-symbol DM errors comprises a first error corresponding to a first symbol and a second error corresponding to a second symbol adjacent to the first symbol, wherein a sign of the first error is opposite to a sign of the second error; and an output to output the plurality of codewords.

2. The apparatus of claim 1, wherein the processor is configured to determine the plurality of parity symbols such that a result of the parity function is a predefined no-error parity value.

3. The apparatus of claim 1, wherein the processor is configured to determine a first result by applying a first modulo function to the plurality of data symbols, and to determine the plurality of parity symbols such that a second result of a second modulo function applied to the plurality of parity symbols is an additive inverse of the first result.

4. The apparatus of claim 1, wherein the parity function comprises a modulo operation applied to a sum of a plurality of products of a plurality of coefficients respectively multiplied by the plurality of symbols.

5. The apparatus of claim 4, wherein the plurality of coefficients comprises a plurality of data coefficients and a plurality of parity coefficients, the plurality of data coefficients to be respectively multiplied by the plurality of data symbols, the plurality of parity coefficients to be respectively multiplied by the plurality of parity symbols.

6. The apparatus of claim 4, wherein the plurality of coefficients comprises a first plurality of coefficients and a second plurality of coefficients, the first plurality of coefficients to be respectively multiplied by a first plurality of symbols in odd positions, the second plurality of coefficients to be respectively multiplied by a second plurality of symbols in even positions, wherein the first plurality of coefficients is based on a first function, and the second plurality of coefficients is based on a second function different from the first function.

7. The apparatus of claim 6, wherein one plurality of coefficients of the first and second pluralities of coefficients comprises a decreasing arithmetic sequence, and another plurality of coefficients of the first and second pluralities of coefficients comprises an increasing arithmetic sequence.

8. The apparatus of claim 4, wherein a divisor of the modulo operation is based on four times a count of symbols in the plurality of symbols.

9. The apparatus of claim 1, wherein a particular parity value of the plurality of different parity values corresponding to a particular two-symbol DM error of the plurality of two-symbol DM errors is configured to identify a position of the particular two-symbol DM error, a sign of a first error of the particular two-symbol DM error, and a sign of a second error of the particular two-symbol DM error.

10. The apparatus of claim 1, wherein the plurality of different parity values comprises a first plurality of parity values to identify the plurality of one-symbol DM errors, respectively, and a second plurality of parity values to identify the plurality of two-symbol DM errors, respectively, wherein an absolute value of each of the first plurality of parity values is equal to or greater than a predefined value, and an absolute value of each of the second plurality of parity values is less than the predefined value.

11. The apparatus of claim 1, wherein a first parity value of the plurality of different parity values is to identify a first two-symbol DM error at a particular position in the codeword, and a second parity value of the plurality of different parity values is to identify a second two-symbol DM error at the particular position, wherein a sign of a first error of the first two-symbol DM error is opposite to a sign of a first error of the second two-symbol DM error, and a sign of a second error of the first two-symbol DM error is opposite to a sign of a second error of the second two-symbol DM error.

12. The apparatus of claim 11, wherein a third parity value of the plurality of different parity values is to identify a first one-symbol DM error at the particular position, and a fourth parity value of the plurality of different parity values is to identify a second one-symbol DM error at the particular position, a sign of the first one-symbol DM error is opposite to a sign of the second one-symbol DM error.

13. The apparatus of claim 1, wherein the DM scheme comprises a Pulse Width Modulation (PWM) scheme, wherein the first symbol corresponds to a first pulse in the transmission, and the second symbol corresponds to a second pulse in the transmission, the second pulse adjacent to the first pulse, wherein the two-symbol DM error corresponds to an edge-shift of an edge, which is shared between the first pulse and the second pulse.

14. The apparatus of claim 1 comprising a transmitter to transmit the transmission modulated according to the DM scheme.

15. The apparatus of claim 14 comprising:
a communication interface to communicate the transmission modulated according to the DM scheme;
a receiver to process a received transmission based on the transmission modulated according to the DM scheme; and
a decoder to decode a received codeword of the received transmission, the decoder configured to determine a decoder parity value of the parity function applied to a plurality of symbols of the received codeword, and, based on the decoder parity value, to identify a two-symbol DM error in the received codeword.

16. An apparatus comprising:
a decoder configured to decode a received transmission modulated according to a Differential Modulation (DM) scheme, the decoder comprising:
an input to receive a codeword of the received transmission, the codeword comprising a plurality of symbols comprising a plurality of data symbols and a plurality of parity symbols; and
a processor configured to decode the codeword, the processor configured to determine a parity value of a parity function applied to the plurality of symbols, and, based on the parity value, to identify a two-symbol DM error in the plurality of symbols, the two-symbol DM error comprising a first error corresponding to a first symbol and a second error corresponding to a second symbol adjacent to the first symbol, wherein a sign of the first error is opposite to a sign of the second error.

17. The apparatus of claim 16, wherein the processor is configured to determine a position of the two-symbol DM error in the codeword, the sign of the first error, and the sign of the second error based on the parity value.

18. The apparatus of claim 16, wherein the parity function is configured to provide a plurality of different parity values to identify a respective plurality of possible errors, the plurality of possible errors comprising a plurality of two-symbol DM errors and a plurality of one-symbol DM errors.

19. The apparatus of claim 16, wherein the parity function comprises a modulo operation applied to a sum of a plurality of products of a plurality of coefficients respectively multiplied by the plurality of symbols.

20. The apparatus of claim 19, wherein the plurality of coefficients comprises a first plurality of coefficients and a second plurality of coefficients, the first plurality of coefficients respectively multiplied by a first plurality of symbols in odd positions, the second plurality of coefficients respectively multiplied by a second plurality of symbols in even positions, wherein the first plurality of coefficients is based on a first function, and the second plurality of coefficients is based on a second function different from the first function.

21. The apparatus of claim 16, wherein the processor is configured to determine two corrected symbols based on the detected two-symbol DM error, and to output a decoded codeword comprising a plurality of decoded data symbols corresponding to the codeword, the plurality of decoded data symbols based on the two corrected symbols.

22. A product comprising one or more tangible computer-readable non-transitory storage media comprising computer-executable instructions operable to, when executed by at least one processor, enable the at least one processor to cause an encoder to encode data for a transmission modulated according to a Differential Modulation (DM) scheme, the instructions, when executed, to cause the encoder to:

encode the data into a plurality of codewords, a codeword of the plurality of codewords comprising a plurality of symbols comprising a plurality of data symbols and a plurality of parity symbols, the plurality of parity symbols based on a parity function applied to the plurality of symbols, the parity function configured to provide a plurality of different parity values corresponding to a respective plurality of possible errors in the plurality of symbols, the plurality of possible errors comprising a plurality of two-symbol DM errors and a plurality of one-symbol DM errors, wherein a two-symbol DM error of the plurality of two-symbol DM errors comprises a first error corresponding to a first symbol and a second error corresponding to a second symbol adjacent to the first symbol, wherein a sign of the first error is opposite to a sign of the second error; and output the plurality of codewords.

23. The product of claim 22, wherein the parity function comprises a modulo operation applied to a sum of a plurality of products of a plurality of coefficients respectively multiplied by the plurality of symbols.

24. The product of claim 23, wherein the plurality of coefficients comprises a first plurality of coefficients and a second plurality of coefficients, the first plurality of coefficients to be respectively multiplied by a first plurality of symbols in odd positions, the second plurality of coefficients to be respectively multiplied by a second plurality of symbols in even positions, wherein the first plurality of coefficients is based on a first function, and the second plurality of coefficients is based on a second function different from the first function.

25. The product of claim 22, wherein the plurality of different parity values comprises a first plurality of parity values to identify the plurality of one-symbol DM errors, respectively, and a second plurality of parity values to identify the plurality of two-symbol DM errors, respectively, wherein an absolute value of each of the first plurality of parity values is equal to or greater than a predefined value, and an absolute value of each of the second plurality of parity values is less than the predefined value.

* * * * *